(12) United States Patent  
Cardona et al.

(10) Patent No.: US 12,554,610 B2
(45) Date of Patent: Feb. 17, 2026

(54) SYSTEMS AND METHODS FOR AN ARTIFICIAL INTELLIGENCE-BASED APPLIANCE END-OF-LIFE CALCULATOR

(71) Applicant: State Farm Mutual Automobile Insurance Company, Bloomington, IL (US)

(72) Inventors: Alexander Cardona, Gilbert, AZ (US); Michael P. Baran, Bloomington, IL (US); Daniel Wilson, Glendale, AZ (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 18/665,103

(22) Filed: May 15, 2024

(65) Prior Publication Data

US 2025/0068533 A1    Feb. 27, 2025

Related U.S. Application Data

(60) Provisional application No. 63/533,809, filed on Aug. 21, 2023.

(51) Int. Cl.
  *G06F 11/30*  (2006.01)
  *G06F 11/32*  (2006.01)
  (Continued)

(52) U.S. Cl.
  CPC ........ *G06F 11/3013* (2013.01); *G06F 11/321* (2013.01); *G06K 19/06037* (2013.01); *G06Q 10/20* (2013.01)

(58) Field of Classification Search
  CPC ............... G06F 11/321; G06F 11/3089; G06F 11/2257; G06F 11/2263
  (Continued)

(56) References Cited

U.S. PATENT DOCUMENTS

| | | | |
|---|---|---|---|
| 6,411,908 B1 * | 6/2002 | Talbott | G05B 23/0224 |
| | | | 702/182 |
| 8,433,344 B1 | 4/2013 | Virga | |

(Continued)

FOREIGN PATENT DOCUMENTS

| | | | | |
|---|---|---|---|---|
| AU | 2015100551 A4 | 5/2015 | | |
| CN | 115917565 A | * | 4/2023 | ......... G05B 23/0283 |
| WO | 2018052595 A1 | 3/2018 | | |

OTHER PUBLICATIONS

Okumura et al., Translated document of CN-115917565-A, published Apr. 4, 2023 (Year: 2023).*

(Continued)

*Primary Examiner* — Chae M Ko
(74) *Attorney, Agent, or Firm* — Armstrong Teasdale LLP

(57) ABSTRACT

A computer system is provided. The computer system may be programmed to: (a) receive appliance data relating to a first appliance; (b) compute, using an artificial intelligence model, a predicted remaining lifetime of the first appliance based upon the received appliance data, wherein the artificial intelligence model is trained based upon historical appliance data including historical lifetimes of appliances; and/or (c) transmit content data to a user device that, when received by the user device, causes the user device to generate a user interface including at least the predicted remaining lifetime.

18 Claims, 9 Drawing Sheets

(51) Int. Cl.
  *G06K 19/06* (2006.01)
  *G06Q 10/20* (2023.01)
(58) Field of Classification Search
  USPC .......................................... 714/47.1, 47.3, 26
  See application file for complete search history.

(56) References Cited

U.S. PATENT DOCUMENTS

| | | | |
|---|---|---|---|
| 8,712,805 | B1 | 4/2014 | Ferries et al. |
| 10,055,793 | B1 | 8/2018 | Call et al. |
| 10,062,118 | B1 | 8/2018 | Bernstein et al. |
| 10,210,498 | B1* | 2/2019 | Meyyappan ............ G06Q 20/40 |
| 10,229,394 | B1 | 3/2019 | Davis et al. |
| 10,623,509 | B2 | 4/2020 | Delinselle et al. |
| 10,672,081 | B1 | 6/2020 | Lyons et al. |
| 10,699,346 | B1 | 6/2020 | Corder et al. |
| 10,861,115 | B1 | 12/2020 | Stricker et al. |
| 11,003,334 | B1 | 5/2021 | Conway et al. |
| 11,037,255 | B1 | 6/2021 | Ganev et al. |
| 11,055,797 | B1 | 7/2021 | Carone |
| 11,087,347 | B1 | 8/2021 | De Guia et al. |
| 11,087,420 | B1 | 8/2021 | Trundle |
| 11,210,741 | B1 | 12/2021 | Allen et al. |
| 11,405,231 | B2 | 8/2022 | Kim et al. |
| 11,466,388 | B2 | 10/2022 | Choung et al. |
| 11,501,100 | B1 | 11/2022 | Geng et al. |
| 11,656,097 | B2 | 5/2023 | Vega et al. |
| 11,748,817 | B2 | 9/2023 | Szott |
| 2008/0255862 | A1 | 10/2008 | Bailey et al. |
| 2011/0270773 | A1 | 11/2011 | Siekman et al. |
| 2011/0295624 | A1 | 12/2011 | Chapin et al. |
| 2012/0072239 | A1 | 3/2012 | Gibbard et al. |
| 2015/0061859 | A1 | 3/2015 | Matsuoka et al. |
| 2015/0222476 | A1* | 8/2015 | Kondo ................ H04L 12/2825 |
| | | | 709/223 |
| 2016/0048934 | A1 | 2/2016 | Gross |
| 2016/0055594 | A1 | 2/2016 | Emison et al. |
| 2016/0275633 | A1 | 9/2016 | Gitt et al. |
| 2016/0321587 | A1 | 11/2016 | Gitt et al. |
| 2018/0033087 | A1 | 2/2018 | Delinselle et al. |
| 2018/0165592 | A1* | 6/2018 | Huang ............... G05B 19/4065 |
| 2019/0251520 | A1 | 8/2019 | Bentley, III et al. |
| 2021/0011448 | A1 | 1/2021 | Coleman et al. |
| 2021/0018335 | A1 | 1/2021 | Hood |
| 2021/0019847 | A1 | 1/2021 | Sneed |
| 2021/0150651 | A1 | 5/2021 | Shoup |
| 2021/0182986 | A1 | 6/2021 | Butler et al. |
| 2021/0279791 | A1 | 9/2021 | Jacoby |
| 2021/0284179 | A1* | 9/2021 | Diamond .......... B60W 50/0205 |
| 2021/0350471 | A1 | 11/2021 | Hakimi-Boushehri et al. |
| 2021/0398054 | A1* | 12/2021 | Jaggers ............. G06Q 10/06398 |
| 2022/0203001 | A1* | 6/2022 | Kirkpatrick ....... A61M 1/06935 |
| 2022/0283576 | A1* | 9/2022 | Cheng ................ G05B 23/0254 |
| 2022/0343443 | A1 | 10/2022 | Graham et al. |
| 2022/0391794 | A1 | 12/2022 | Singh et al. |
| 2023/0035517 | A1 | 2/2023 | Bentley, III et al. |
| 2023/0060059 | A1* | 2/2023 | Kornbluth .............. G01N 33/18 |
| 2023/0122787 | A1 | 4/2023 | Huerta et al. |
| 2023/0261897 | A1 | 8/2023 | Heo et al. |
| 2023/0307117 | A1* | 9/2023 | Kumar .................. G16H 40/67 |
| 2024/0103958 | A1 | 3/2024 | Lee et al. |
| 2024/0233931 | A1* | 7/2024 | Dinh ..................... G16H 40/40 |
| 2024/0402700 | A1* | 12/2024 | Petit-Bois ................ G05B 1/03 |

OTHER PUBLICATIONS

Liu et al., "Design and Implementation of Smart-Home Monitoring System with the Internet of Things Technology," p. 5, Jan. 2016. Retrieved from: https://www.researchgate.net/publication/300330870_Design_and_Implementation_of_Smart-Home_Monitoring_System_with_the_Internet_of_Things_Technology.

Michalis et al., "Quality Evaluation of Residential Houses: The Development of a Real-Time Quality Assessment Tool," p. 11-12, Jan. 2013. Retrieved from: https://www.researchgate.net/publication/233841366_Quality_Evaluation_of_Residential_Houses_The_Development_of_a_Real-Time_Quality_Assessment_Tool.

Moore et al., "An intelligent maintenance system for continuous cost-based prioritisation of maintenance activities," Aug. 2006. Retrieved from: https://www.researchgate.net/publication/222428855_An_intelligent_maintenance_system_for_continuous_cost-based_prioritisation_of_maintenance_activities.

Spoor et al., "How can data generated by smart home devices help identify consumer needs?," p. 7, Jul. 2016. Retrieved from: https://essay.utwente.nl/69990/1/Spoor_BA_BMS.pdf.

Build and deploy LLM Agents: Genai agents: Agent M: Floatbot. floatbot.ai., Website, https://floatbot.ai/llm-agent-m?utm_source=banner-AgentM, 2023.

* cited by examiner

SYSTEMS AND METHODS FOR AN ARTIFICIAL INTELLIGENCE-BASED APPLIANCE END-OF-LIFE CALCULATOR

CROSS-REFERENCE TO RELATED APPLICATIONS

This application claims the benefit of priority of U.S. Provisional Patent Application Ser. No. 63/533,809, filed Aug. 21, 2023, and entitled "SYSTEMS AND METHODS FOR AN ARTIFICIAL INTELLIGENCE-BASED APPLIANCE END-OF-LIFE CALCULATOR," the contents and disclosures of which are hereby incorporated in their entirety.

FIELD OF THE DISCLOSURE

The field of the disclosure relates generally to artificial intelligence modeling, and more specifically, to using an artificial intelligence model and sensor data to predict an end-of-life and/or suggested maintenance for home appliances and other machines or components of a home.

BACKGROUND

Home appliances and other devices, systems, structural components, and machines within a home generally have a limited lifespan. The remaining lifespan of an appliance is not always predictable by a homeowner, particularly in cases, such as when a homeowner moves into a new home, in which the homeowner may not know when the appliance was installed. If homeowners were to know when an appliance is reaching the end of its intended life, the homeowners could take steps to plan for the end of the appliance's life, such as by saving for a replacement and/or performing maintenance or service to extend the life of the appliance. For example, if a water heater is reaching the end of its life, the homeowner could take steps to maintain or replace the water heater so that the water heater does not fail, causing a loss of access to hot water and potential damage to the home.

Accordingly, a system capable of predicting a remaining lifetime of an appliance, including in situations where the homeowner may be unaware of the age of the appliance, is therefore desirable. Conventional techniques may include additional inefficiencies, encumbrances, ineffectiveness, and/or other drawbacks as well.

BRIEF DESCRIPTION

The present embodiments may relate to, inter alia, systems and methods that retrieve and aggregate data relating to appliances and/or other devices installed in homes and/or buildings, which may include (i) data about the appliances inputted by a homeowner and/or solicited via a survey of the homeowner, (ii) data provided by third parties, and (iii) historical information relating to lifetimes of similar appliances. Data sources may include, for example, third party applications and other available information on the Internet. The system may query a machine learning and/or AI model, such as a large language trained generative AI model, to compute a predicted remaining lifetime for an appliance and create, for example, recommendations of maintenance actions or other steps that may be taken to extend a lifetime of the appliance, and/or a timeline and calendar recommending when the recommended maintenance actions should be implemented. The output of the AI model may further include computer executable instructions for generating a user interface (e.g., within a mobile application and/or web page) to present the predicted remaining lifetime associated with a user's registered appliances and any corresponding recommendations. The system may include less, or alternate functionality, including that discussed elsewhere herein.

In one aspect, a computer system for predicting a lifetime of one or more appliances may be provided. The system may include one or more local or remote processors, servers, sensors, transceivers, mobile devices, wearables, smart watches, smart contact lenses, voice bots, chat bots, ChatGPT bots, augmented reality glasses, virtual reality headsets, mixed or extended reality headsets or glasses, and other electronic or electrical components, which may be in wired or wireless communication with one another. For example, in one instance, the computer system may be programmed to: (a) receive appliance data relating to a first appliance; (b) compute, using an artificial intelligence model, a predicted remaining lifetime of the first appliance based upon the received appliance data, wherein the artificial intelligence model is trained based upon historical appliance data including historical lifetimes of appliances; and/or (c) transmit content data to a user device that, when received by the user device, causes the user device to generate a user interface including at least the predicted remaining lifetime. The computer system may include additional, less, or alternate functionality, including that discussed elsewhere herein.

In another aspect, a computing device for predicting a lifetime of one or more appliances may be provided. The computing device may include at least one processor and at least one memory device. The at least one processor may be configured to: (a) receive appliance data relating to a first appliance; (b) compute, using an artificial intelligence model, a predicted remaining lifetime of the first appliance based upon the received appliance data, wherein the artificial intelligence model is trained based upon historical appliance data including historical lifetimes of appliances; and/or (c) transmit content data to a user device that, when received by the user device, causes the user device to generate a user interface including at least the predicted remaining lifetime. The computing device may have additional, less, or alternate functionality, including that discussed elsewhere herein.

In yet another aspect, a computer-implemented method for predicting a lifetime of one or more appliances may be provided. The computer-implemented method may be performed by a computing device including at least one processor and at least one memory device. The method may include, via the at least one processor: (a) receiving appliance data relating to a first appliance; (b) computing, using an artificial intelligence model, a predicted remaining lifetime of the first appliance based upon the received appliance data, wherein the artificial intelligence model is trained based upon historical appliance data including historical lifetimes of appliances; and/or (c) transmitting content data to a user device that, when received by the user device, causes the user device to generate a user interface including at least the predicted remaining lifetime. The method may have additional, less, or alternate actions, including that discussed elsewhere herein.

In still another aspect, a non-transitory computer readable medium having computer-executable instructions embodied thereon for evaluating aspects of health of a residential property is provided. When executed by at least one processor, the computer-executable instructions cause the at least one processor a to: (a) receive appliance data relating to a first appliance; (b) compute, using an artificial intelligence model, a predicted remaining lifetime of the first appliance based upon the received appliance data, wherein the artificial intelligence model is trained based upon historical appliance data including historical lifetimes of appliances; and/or (c) transmit content data to a user device that, when received by the user device, causes the user device to generate a user interface including at least the predicted remaining lifetime. The computer readable medium may have instructions that direct additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The figures described below depict various aspects of the systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and are instrumentalities shown, wherein.

Figure 1:
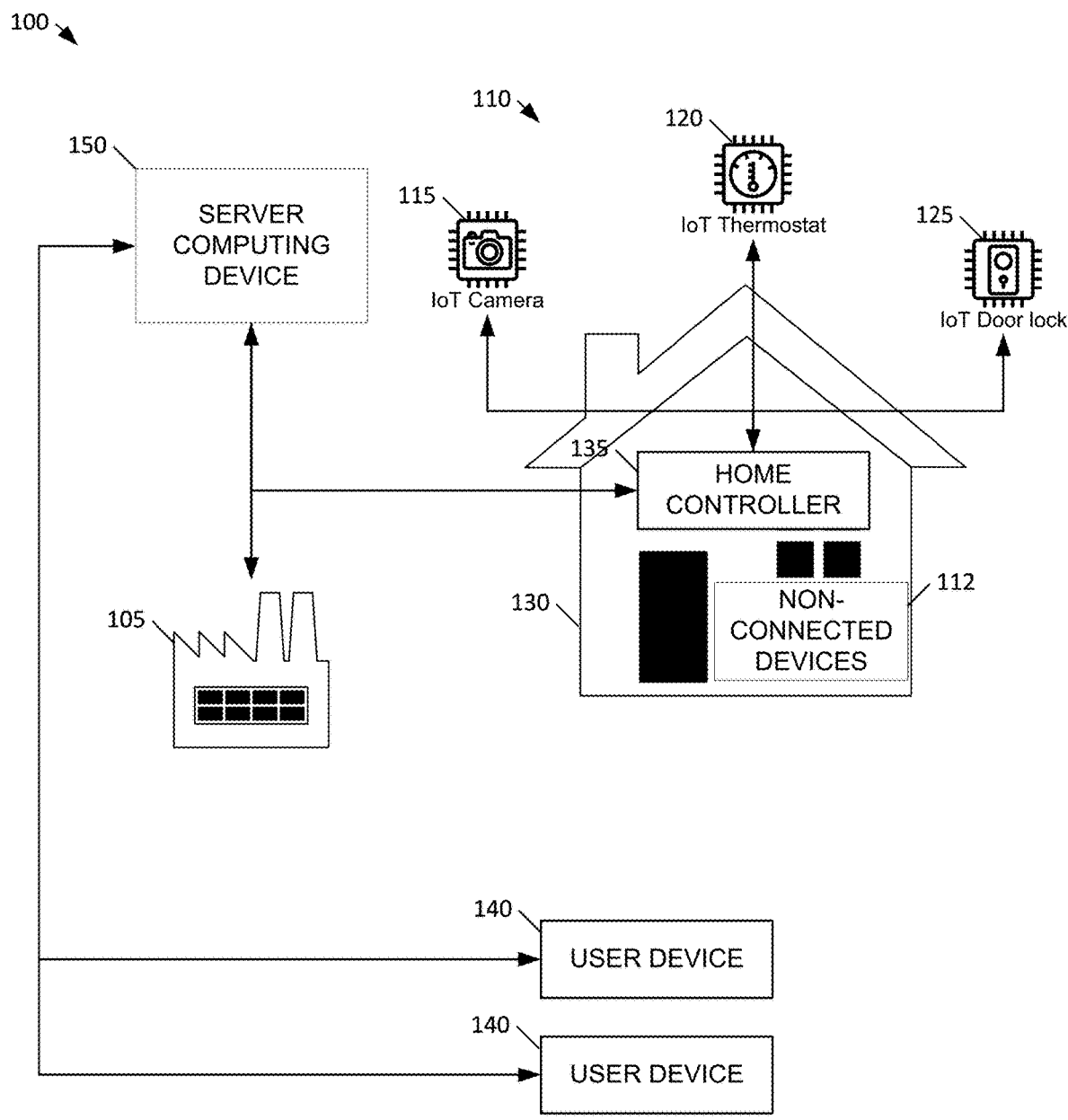
FIG. 1 illustrates an exemplary computer system for predicting lifetimes of home appliances and generating AI-based recommendations for improving a lifetimes of home appliances in accordance with the present disclosure.

The figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments may relate to, inter alia, systems and methods that retrieve and aggregate data relating to appliances and/or other devices or structural components installed or used in homes and/or buildings, which may include (i) data about the appliances inputted by a homeowner and/or solicited via a survey of the homeowner, (ii) data provided by third parties, and (iii) historical information relating to lifetimes of similar appliances. As used herein, the term "appliance" may refer to any electrical device, mechanical device, structural component (e.g., pools and related equipment, solar installations, roofs, decks, interior walls, and/or any other devices or equipment used within a home or building), and/or any structure or device in, near, and/or related to a home or building. Data sources may include, for example, third party applications and other available information on the Internet.

The system may query a machine learning and/or AI model, such as a large language trained generative AI model, to compute a predicted remaining lifetime for an appliance and create, for example, recommendations of maintenance actions or other steps that may be taken to extend a lifetime of the appliance, and/or a timeline and calendar recommending when the recommended maintenance actions should be implemented. The output of the AI model may further include computer executable instructions for generating a user interface (e.g., within a mobile application and/or web page) to present the predicted remaining lifetime associated with a user's registered appliances and any corresponding recommendations. The use of the generative AI model may be available in various mediums such as a computer and/or mobile application, chat screens, web page, voice interaction with a voice chat-capable connected home device, voice bots or chat bots, ChatGPT bots, and/or social media messaging.

In some embodiments, the system may receive input from the homeowner including one or more appliances that are currently installed in a home. For example, the user may, via an application, input manufacturer and model information, scan a quick response (QR) code or bar code on the appliance, and/or capture an image of the appliance, based upon which the system may identify the model and/or age of the appliance. This information may be stored by the system (e.g., in association with a user account) and carried over (e.g., from one user account to another) when the appliance is transferred from one owner to another (e.g., due to a sale of the appliance or home in which the appliance is installed). The system may train a machine learning and/or AI model, such as a large language trained generative AI (e.g., ChatGPT) model, using historical data, such as data relating to lifetimes, maintenance histories, and usage of other appliances. Accordingly, the system may, using the machine learning and/or AI model, provide the homeowner information relating to the appliances, such as a predicted remaining lifetime of the appliances. In some such embodiments, the AI model may provide a recommendation on maintenance or other steps that may extend the lifetime of the appliance.

In some embodiments, the AI model may search stores or services relating to the appliance and, in some such embodiments, provide a link (e.g., a hyperlink) to the recommended stores or services to the user via a computing device (e.g., via a mobile application, web page, and/or email). For example, the links may relate to maintenance services or, if the appliance is nearing the end of its lifetime, purchasing a replacement.

In some embodiments, the system may be programmed to use the AI model to ask the user questions directly about home concerns and repairs, for example, via natural language and/or text prompts. The AI model may use geolocation to determine a repair and/or maintenance professional located near, at, or around the vicinity of the user's geolocation, and then recommend that professional for helping with the repairs or installs.

In some embodiments, the system may be communicably coupled to a communication network and/or a financial services provider. The system may receive insurance information from the financial services provider. This insurance information may include claims information relating to specific claims submitted in the vicinity or surrounding geolocation of the homeowner. The system may use the received claims information to make recommendations (e.g., using the AI model) for replacing and/or performing preventative maintenance on appliances that are nearing an end of their lifetime (e.g., so that the appliances do not fail and/or cause injury or damage). The system may connect an insurance policy of the homeowner to the recommendations, in which the application may display potential changes to the homeowner's insurance policy based on implementation of the recommendation (e.g., whether a replacement is purchased or preventative maintenance is performed). The system may prioritize the recommendations based on potential changes to a customer's insurance policy or claims information submitted by other customers living in an area geolocated near the homeowner.

In some embodiments, the system may also be in communication with one or more marketplaces that provide access to and matching with companies and/or individuals that provide products (e.g., replacements for appliances) and/or services (e.g., maintenance services) recommended by the AI model. In some embodiments, homeowners may be able to list registered appliances on the marketplace for sale and/or transfer to other homeowners.

In the exemplary embodiment, the system may build an AI model that receives inputs about appliances and/or other devices installed in homeowners' homes (sometimes referred to herein as "appliance data"). In some embodiments, the AI model may additionally receive historical data relating to other appliances (sometimes referred to herein as "historical appliance data"), such as those similar (e.g., or a similar manufacturer, model, and/or age) to those installed in the home. The historical appliance data may include historical data relating to lifetimes or how long other appliances lasted before needing to be repaired or replaced. This received data may be used to train the AI model, to output predictions (e.g., a score or countdown relating to an expected remaining lifetime of the appliances) and/or recommendations (e.g., measures that can be taken to extend a lifetime or otherwise improve functioning of an appliance), as described in further detail below.

In the exemplary embodiment, the system may build the model to output predictions relating to a remaining lifetime of a particular appliance. For example, the model may output a predicted amount of time (e.g., a countdown) remaining before an appliance needs to be replaced. The output may further include recommendations for steps (e.g., preventative maintenance) that can be taken to prolong the lifetime of the appliance. In cases where there are multiple maintenance actions and/or a homeowner has multiple registered appliances each with one or more recommended maintenance actions, the output may further include a recommended order in which to perform the maintenance actions, for example, to reduce a risk of an appliance failing and/or to most cost-effectively prolong the lifetimes of the appliances. For example, the recommended maintenance actions may be prioritized based on, for example, how likely each appliance is to fail (e.g., by prioritizing appliances with lesser expected remaining lifetimes), the practical and financial ease of carrying out the recommendations (e.g., whether they involve hiring professional services and/or ordering new parts), and other such factors. The output generated by the AI model may further include recommendations on where to purchase or obtain products and/or services in the are area relating to the recommended maintenance actions.

In the exemplary embodiment, the system may retrieve appliance data relating to appliances a homeowner has registered. The system may record appliance data associated with the appliances of the homeowner in a user profile associated with the homeowner. In some embodiments, the system may prompt the homeowner to submit a list of one or more currently-installed appliances, for example, as a fillable form, an image of a QR-code, bar code, and/or another visible identifier, a serial number, an image of the appliance, a voice prompt, and/or a text prompt, and/or may receive a natural language query from the homeowner including at least one currently-installed appliances and inquiring for an expected remaining lifetime of the appliance. In some embodiments in which one or more of the appliances are connected devices capable of communicating with the system (e.g., via an internet-connected home controller), the system may retrieve appliance data relating to the connected devices currently installed within the home on its own. For example, the system may communicate with a local home controller that communicates with each of the connected devices in the home, and retrieve information about the connected devices via the home controller.

In some embodiments, based upon the data inputted by the user, the system may retrieve additional appliance data relating to the appliance that may be used to predict a lifetime and/or determine maintenance recommendations. For example, the system may determine an age and/or installation date of an appliance based upon, for example, a serial number of the appliance, transaction data relating to an initial purchase of the appliance, and/or previous registrations of the appliance in the system (e.g., if the appliance has been registered by a previous owner and sold or transferred to the current owner). Other examples of information that may be helpful in predicting a lifetime of a particular appliance (sometimes referred to herein as "contextual data") may include, but are not limited to, a repair or maintenance history of the appliance, demographic information relating to users of the appliance (e.g., appliances accessible by children may sometimes be treated roughly), crowdsourced data relating to the appliance, data retrieved from a manufacturer of the appliance, a geographic location in which the appliance is located (e.g., whether the appliance may have been exposed to extreme temperatures, humidity, hard water, seismic activity, etc.), previous insurance and/or warranty claims relating to the appliance, attributes of the home in which the appliance is installed (e.g., power usage, power outage statistics, data gathered from sensors and/or home controllers, water usage, temperatures, doors and/or windows being open or closed, current and future weather conditions, etc.) and/or other information relating the appliance.

In the exemplary embodiment, the AI model may compute an expected remaining lifetime for an appliance based upon the retrieved data. The remaining lifetime may be expressed and/or displayed as a countdown value that decreases as time progresses indicating how much of the appliance's life cycle remains. The AI model may also determine an estimated value of how much it will cost to repair or replace the appliance as it ages and gets closer to its end-of-life date. In some embodiments, the estimated remaining lifetime may periodically be updated, for example, in response to the homeowner inputting or the system retrieving new data about the appliance and/or the AI model itself being updated based upon new training data.

In some embodiments, the AI model may further generate recommendations for extending the lifetime of the appliance based upon the retrieved data. The recommendation may include specific maintenance actions that may prolong the lifetime of the product. In some embodiments, the recommendations may include services and/or parts for performing the maintenance, and may prompt for the homeowner to indicate whether the homeowner would like to purchase the recommended services and/or parts. The system may further provide additional information relating to the recommended maintenance actions, such as advantages of the particular maintenance actions, costs, potential cost savings (e.g., due to extending the lifetime of the appliance and/or other costs, such as reducing insurance and/or energy costs), when and how to perform the maintenance actions, and/or alternative options. In some embodiments, the recommendations may be generated in response to query by the homeowner (e.g., in conjunction with computing the estimated remaining lifetime of the appliance) and/or may be periodically generated automatically (e.g., as a monthly report to the homeowner).

In the exemplary embodiment, the AI model may output data in a data interchange format such as JavaScript Object Notation (JSON), which may be interpreted by other components of the system to display information such as the predicted remaining lifetime and/or corresponding recommendations. For example, in embodiments in which the predicted remaining lifetime and/or recommendations are displayed via a mobile application, the mobile application may be configured to generate a user interface (e.g., including text, lists, shapes, colors, sounds, etc.) for presenting the predicted remaining lifetime and/or recommendations based on data output by the AI model.

In the exemplary embodiment, the predicted remaining lifetime and/or recommendations are presented to the homeowner. The predicted remaining lifetime and/or recommendations may be presented as a graphical user interface by a mobile application and/or web page. The recommendations may include a maintenance schedule and/or a curated plan and set of reminders for when certain maintenance actions should be performed. In addition to the predicted remaining lifetime and/or recommendations, the mobile application and/or web page may provide additional information relating to the appliance, such as, for example, replacement parts and links to purchase the replacement parts, owner's manual, warranty information, Energy Star rating. In some embodiments, the predicted remaining lifetime and/or recommendations may be presented as a natural language response, which may include text and/or synthesized speech.

In some embodiments, the recommendations may include a maintenance schedule and/or a curated plan and set of reminders for when certain maintenance actions should be performed. In some embodiments, the recommendations may include a list, for example, a list of ten maintenance actions that can prolong the lifetime of the appliance. In some embodiments, recommendations may include a timeline and/or a recommended order for performing maintenance actions on one or more appliances in the home. The recommendation list may be presented through a user interface that enables the homeowner to select and/or click on listed maintenance actions to automatically purchase and/or schedule parts and/or services associated with the maintenance action. In some embodiments, the recommendation may further indicate a potential increase in the appliance's lifetime and/or potential cost savings (e.g., replacement costs and/or insurance and/or energy savings) that may result from performing a certain maintenance action.

If a recommended action is performed the system may automatically update the predicted remaining lifetime associated with the appliance. In some embodiments, the system may also notify an insurer of the home, so that the insurer may adjust a premium associated with the home accordingly. The system may continually update the recommendations based on newly received data, feedback received from homeowners, and/or decisions made by homeowners based upon previous recommendations. The newly received data may also be used to update the predicted remaining lifetime. This may enable a gamification element, in which the homeowner may be rewarded for performing recommended maintenance actions by seeing an increase in the predicted remaining lifetime of the appliance in the user interface.

In the exemplary embodiment, feedback may be used to continually update the AI model. For example, new data relating to lifetimes of appliances, insurance and/or warranty claims relating to appliances, feedback received from homeowners, decisions made by homeowners based upon previous recommendations, and/or other information may be used to update the AI model.

The system may also be in communication with one or more marketplaces that provide access to and matching with companies and/or individuals that provide products (e.g., replacements for appliances) and/or services (e.g., maintenance services) recommended by the AI model. In some embodiments, homeowners may be able to list registered appliances on the marketplace for sale and/or transfer to other homeowners. Transferring ownership of an appliance via the marketplace may enable the system to automatically register the appliance with a new owner. Other examples of products and/or services provided by the marketplace include, but are not limited to, plumbers, smart home devices, security systems, maintenance, such as for an appliance and/or an HVAC (heating, ventilation, and air conditioning) system, and/or insurance.

In some embodiments, the system may include a risk evaluation engine that may evaluate data associated with appliances installed in a home to evaluate various risks associated with the home. For example, certain appliances may pose a risk of damaging the home when reaching an end of their lifetime. The system may use numerous data points to evaluate such risks to a residential property and may compute a composite risk score and/or various focused risk scores for the property. The risk score (e.g., or likelihood of damage score) may be a numeric value and/or a category (e.g., excellent, good, fair, and poor).

Such risk scores may be used, for example by an insurance provider, to evaluate insurability of the property and its assets, to price insurance policy options for the property, or to provide policy discounts and verify compliance for risk mitigating changes, actions, or behaviors. Further, such risk scores may be used to determine to recommend certain appliances be replaced or to perform maintenance on the appliances. For example, appliances that, if replaced or serviced, would provide a greater reduction to the risk score may be prioritized.

In some embodiments, the system may generate a risk score for different categories of risk, such as property risk, fire protection, and safety, which may be presented individually within the user interface with related recommendations. For example, the fire protection rating may be displayed along with fire-protection related recommendations, such as recommendation relating to products that may result in a reduction of fire risk if implemented (e.g., replacing appliances that tend to draw excessive electrical currents and/or cause electrical shorts when the appliances are near the end of their lifetime).

While various examples provided herein describe application of the system to various aspects of home appliances and other home systems, the systems and methods described herein may also be used for performing other analysis, such as vehicles, businesses, municipal locations, and/or other locations and/or items.

Exemplary System for Generating Recommendations

FIG. 1 illustrates an exemplary computer system 100 for monitoring and analyzing homes, including predicting remaining lifetimes of appliances within the homes, in accordance with at least one embodiment of this disclosure. System 100 illustrates monitoring and other devices to receive, analyze, and report the data collected about the home.

In the exemplary embodiment, a manufacturer server 105 provides one or more IoT devices 110, also known as IoT devices 110, and/or non-connected devices 112. These IoT devices 110 and/or non-connected devices 112 may be in or around a home 130. IoT devices 110 may include, but are not limited to IoT cameras 115, IoT thermostats 120, IoT door locks 125, and/or any other internet connected device, including, but not limited to, appliances (e.g., smart appliances) user devices 140, which may be mobile devices, laptops, appliances, and/or a mobile phones, one or more voice or chat bots, a computer device, including, but not limited to, a desktop computer and/or a router, and/or a home controller 135. In at least one embodiment, the home controller 135 is in wired or wireless communication the one or more IoT devices 110 in home 130. In some embodiments, the home controller 135 may be a router or Wi-Fi providing device in the home 130. In other embodiments, the home controller 135 is a smart home controller that controls one or more of IoT devices 110 and may provide communication between the user and the individual IoT devices 110.

Non-connected devices 112 may include appliances and/or other home devices that are not connected to the internet. For example, certain non-connected devices 112 may be incapable of internet connection and/or devices a homeowner has opted not to connect to the internet. Non-connected devices may be registered with manufacturer server 105 and/or server computing device 150 via user input. For example, a homeowner may input information (e.g., manufacturer, model, serial number) about non-connected devices 112 via a mobile application and/or web page, and or input images, such as QR codes and/or bar codes, based upon which server computing device may identify the non-connected devices 112 (e.g., by performing a lookup in a database associating the QR codes and/or bar codes with specific non-connected devices 112). In some embodiments, server computing device 150 may be capable of identifying a non-connected device 112 based upon an image (e.g., an image of the entire non-connected device 112) input by the user using machine learning or AI-based image analysis techniques.

In some embodiments, each IoT device 110 may collect data about the home either directly or indirectly. For example, a smart light bulb may report when the bulb is on and off. This may indirectly indicate whether or not an individual is near the bulb. In the at least one embodiment, many IoT devices 110 are in communication with one or more servers of the manufacturer server 105. The manufacturer server 105 may provide additional services, such as remote activation. The manufacturer server 105 may also collect data observed by IoT device 110, including, but not limited to, usage data about IT device 110.

In some embodiments, a server computing device 150 may be in communication with one or more of the IoT devices 110, the home controller 135, and/or the manufacturer servers 105. Server computing device 150 may collect data from IoT devices 110 for use in determining recommendations for additional IoT devices 110 and/or other connected home devices that may be installed in home 130. Server computing device 150 determines one or more products and/or services that may reduce risk and/or improve safety of home 130. Server computing device 150 may be in communication with one or more user devices 140 associated with respective homeowners, though which server computing device may present generated recommendations, for example, recommendations relating to a remaining lifetime of an appliance or certain maintenance steps that should be taken to extend the lifetime of the appliance.

In the exemplary embodiment, server computing device 150 may build an AI model that receives inputs about appliances and/or other devices installed in home 130 (sometimes referred to herein as "appliance data"). In some embodiments, the AI model may additionally receive historical data relating to other appliances (sometimes referred to herein as "historical appliance data"), such as those similar (e.g., or a similar manufacturer, model, and/or age) to those installed in home 130. The historical appliance data may include historical data relating to lifetimes or how long other appliances lasted before needing to be repaired or replaced. This received data may be used to train the AI model, to output predictions (e.g., a score or countdown relating to an expected remaining lifetime of the appliances and/or recommendations (e.g., measures that can be taken to extend a lifetime or otherwise improve functioning of an appliance), as described in further detail below.

In the exemplary embodiment, server computing device 150 may build the model to output predictions relating to a remaining lifetime of a particular appliance (e.g., IoT device 110 or non-connected device 112). For example, the model may output a predicted amount of time (e.g., a countdown) remaining before an appliance needs to be replaced. The output may further include recommendations for steps (e.g., preventative maintenance) that can be taken to prolong the lifetime of the appliance. In cases where there are multiple maintenance actions and/or a homeowner has multiple registered appliances each with one or more recommended maintenance actions, the output may further include a recommended order in which to perform the maintenance actions, for example, to reduce a risk of an appliance failing and/or to most cost-effectively prolong the lifetimes of the appliances. For example, the recommended maintenance actions may be prioritized based on, for example, how likely each appliance is to fail (e.g., by prioritizing appliances with lesser expected remaining lifetimes), the practical and financial ease of carrying out the recommendations (e.g., whether they involve hiring professional services and/or ordering new parts), and other such factors. The output generated by the AI model may further include recommendations on where to purchase or obtain products and/or services in the are area relating to the recommended maintenance actions.

In the exemplary embodiment, server computing device 150 may retrieve appliance data relating to appliances a homeowner has registered. Server computing device 150 may record appliance data associated with the appliances of the homeowner in a user profile associated with the homeowner. In some embodiments, server computing device 150 may prompt (e.g., via user device 140) the homeowner to submit a list of one or more currently-installed appliances, for example, as a fillable form, an image of a QR-code, bar code, and/or another visible identifier, a serial number, an image of the appliance, a voice prompt, and/or a text prompt, and/or may receive a natural language query from the homeowner including at least one currently-installed appliances and inquiring for an expected remaining lifetime of the appliance. In some embodiments in which one or more of the appliances are connected devices capable of communicating with other components of system 100, server computing device 150 may retrieve appliance data relating to IoT devices 110 currently installed within the home on its own. For example, server computing device 150 may communicate with home controller 135 that communicates with each of IoT devices 110 in the home, and retrieve information about the connected devices via home controller 135.

In some embodiments, based upon the data inputted by the user, server computing device 150 may retrieve additional appliance data relating to an appliance that may be used to predict a lifetime and/or determine maintenance recommendations. For example, server computing device 150 may determine an age and/or installation date of an appliance based upon, for example, a serial number of the appliance, transaction data relating to an initial purchase of the appliance, and/or previous registrations of the appliance with server computing device 150 (e.g., if the appliance has been registered by a previous owner and sold or transferred to the current owner). Other examples of information that may be helpful in predicting a lifetime of a particular appliance (sometimes referred to herein as "contextual data") may include, but are not limited to, a repair or maintenance history of the appliance, demographic information relating to users of the appliance (e.g., appliances accessible by children may sometimes be treated roughly), crowdsourced data relating to the appliance, data retrieved from a manufacturer of the appliance, a geographic location in which the appliance is located (e.g., whether the appliance may have been exposed to extreme temperatures, humidity, hard water, seismic activity, etc.), previous insurance and/or warranty claims relating to the appliance, attributes of the home in which the appliance is installed (e.g., power usage, power outage statistics, data gathered from sensors and/or home controllers, water usage, temperatures, doors and/or windows being open or closed, current and future weather conditions, etc.), how often the appliance has been used during its lifetime, and/or other information relating the appliance. In some embodiments, at least some of this data may be retrieved from manufacturer server 105, home controller 135, and/or user devices 140.

In the exemplary embodiment, the AI model may compute and/or output an expected remaining lifetime for an appliance based upon the retrieved data. The remaining lifetime may be expressed and/or displayed as a countdown value that decreases as time progresses indicating how much of the appliance's life cycle remains. The AI model may also determine an estimated value of how much it will cost to repair or replace the appliance as it ages and gets closer to its end-of-life date. In some embodiments, the estimated remaining lifetime may periodically be updated, for example, in response to the homeowner inputting or server computing device 150 retrieving new data about the appliance and/or the AI model itself being updated based upon new training data.

In some embodiments, the AI model may further generate recommendations for extending the lifetime of the appliance based upon the retrieved data. The recommendation may include specific maintenance actions that may prolong the lifetime of the product. In some embodiments, the recommendations may include services and/or parts for performing the maintenance, and may prompt for the homeowner to indicate whether the homeowner would like to purchase the recommended services and/or parts. The system may further provide additional information relating to the recommended maintenance actions, such as advantages of the particular maintenance actions, costs, potential cost savings (e.g., due to extending the lifetime of the appliance and/or other costs, such as reducing insurance and/or energy costs), when and how to perform the maintenance actions, and/or alternative options. In some embodiments, the recommendations may be generated in response to query by the homeowner (e.g., in conjunction with computing the estimated remaining lifetime of the appliance) and/or may be periodically generated automatically (e.g., as a monthly report to the homeowner).

In the exemplary embodiment, the AI model may output data in a data interchange format such as JavaScript Object Notation (JSON), which may be interpreted by other components of system 100 (e.g., user devices 140) to display information such as the predicted remaining lifetime and/or corresponding recommendations. For example, in embodiments in which the predicted remaining lifetime and/or recommendations are displayed via a mobile application (e.g., executed on user device 140), the mobile application may be configured to generate a user interface (e.g., including text, lists, shapes, colors, sounds, etc.) for presenting the predicted remaining lifetime and/or recommendations based on data output by the AI model.

In the exemplary embodiment, the predicted remaining lifetime and/or recommendations are presented to the homeowner. For example, server computing device 150 may provide content data to user device 140 that causes user device 140 to present the predicted remaining lifetime and/or recommendations. The predicted remaining lifetime and/or recommendations may be presented as a graphical user interface by a mobile application and/or web page. The recommendations may include a maintenance schedule and/or a curated plan and set of reminders for when certain maintenance actions should be performed. In addition to the predicted remaining lifetime and/or recommendations, the mobile application and/or web page may provide additional information relating to the appliance, such as, for example, replacement parts and links to purchase the replacement parts, owner's manual, warranty information, Energy Star rating. In some embodiments, the predicted remaining lifetime and/or recommendations may be presented as a natural language response, which may include text and/or synthesized speech.

In some embodiments, the recommendations may include a maintenance schedule and/or a curated plan and set of reminders for when certain maintenance actions should be performed. In some embodiments, the recommendations may include a list, for example, a list of ten maintenance actions that can prolong the lifetime of the appliance. In some embodiments, recommendations may include a timeline and/or a recommended order for performing maintenance actions on one or more appliances in the home. The recommendation list may be presented through a user interface that enables the homeowner to select and/or click on listed maintenance actions to automatically purchase and/or schedule parts and/or services associated with the maintenance action. In some embodiments, the recommendation may further indicate a potential increase in the appliance's lifetime and/or potential cost savings (e.g., replacement costs and/or insurance and/or energy savings) that may result from performing a certain maintenance action. If a recommended action is performed, server computing device 150 may automatically update the predicted remaining lifetime associated with the appliance.

In some embodiments, server computing device 150 may also notify an insurer of the home, so that the insurer may adjust a premium associated with the home accordingly. Server computing device 150 may continually update the recommendations based on newly received data, feedback received from homeowners, and/or decisions made by homeowners based upon previous recommendations. The newly received data may also be used to update the predicted remaining lifetime. This may enable a gamification element, in which the homeowner may be rewarded for performing recommended maintenance actions by seeing an increase in the predicted remaining lifetime of the appliance in the user interface.

In the example embodiment, feedback may be used to continually update the AI model. For example, new data relating to lifetimes of appliances, insurance and/or warranty claims relating to appliances, feedback received from homeowners, decisions made by homeowners based upon previous recommendations, and/or other information may be used to update the AI model.

Server computing device 150 may also be in communication with one or more marketplaces (described in further detail below with respect to FIG. 2) that provide access to and matching with companies and/or individuals that provide products (e.g., replacements for appliances) and/or services (e.g., maintenance services) recommended by the AI model. In some embodiments, homeowners may be able to list registered appliances on the marketplace for sale and/or transfer to other homeowners. Transferring ownership of an appliance via the marketplace may enable server computing device 150 to automatically register the appliance with a new owner. Other examples of products and/or services provided by the marketplace include, but are not limited to, plumbers, smart home devices, security systems, maintenance, such as for an appliance and/or an HVAC (heating, ventilation, and air conditioning) system, and/or insurance.

In some embodiments, server computing device 150 may include a risk evaluation engine that may evaluate data associated with appliances installed in a home to evaluate various risks associated with the home. For example, certain appliances may pose a risk of damaging the home when reaching an end of their lifetime. Server computing device 150 may use numerous data points to evaluate such risks to a residential property and may compute a composite risk score and/or various focused risk scores for the property. The risk score or likelihood of damage score may be a numeric value and/or a category (e.g., excellent, good, fair, and poor).

Such risk scores may be used, for example by an insurance provider, to evaluate insurability of the property and its assets, to price insurance policy options for the property, or to provide policy discounts and verify compliance for risk mitigating changes, actions, or behaviors. Further, such risk scores may be used to determine to recommend certain appliances be replaced or to perform maintenance on the appliances. For example, appliances that, if replaced or serviced, would provide a greater reduction to the risk score may be prioritized. In some embodiments, server computing device 150 may generate a risk score for different categories of risk, such as property risk, fire protection, and safety, which may be presented individually within the user interface with related recommendations. For example, the fire protection rating may be displayed along with fire-protection related recommendations, such as recommendation relating to products that may result in a reduction of fire risk if implemented (e.g., replacing appliances that tend to draw excessive electrical currents and/or cause electrical shorts when the appliances are near the end of their lifetime).

Exemplary Home Monitoring System

Figure 2:
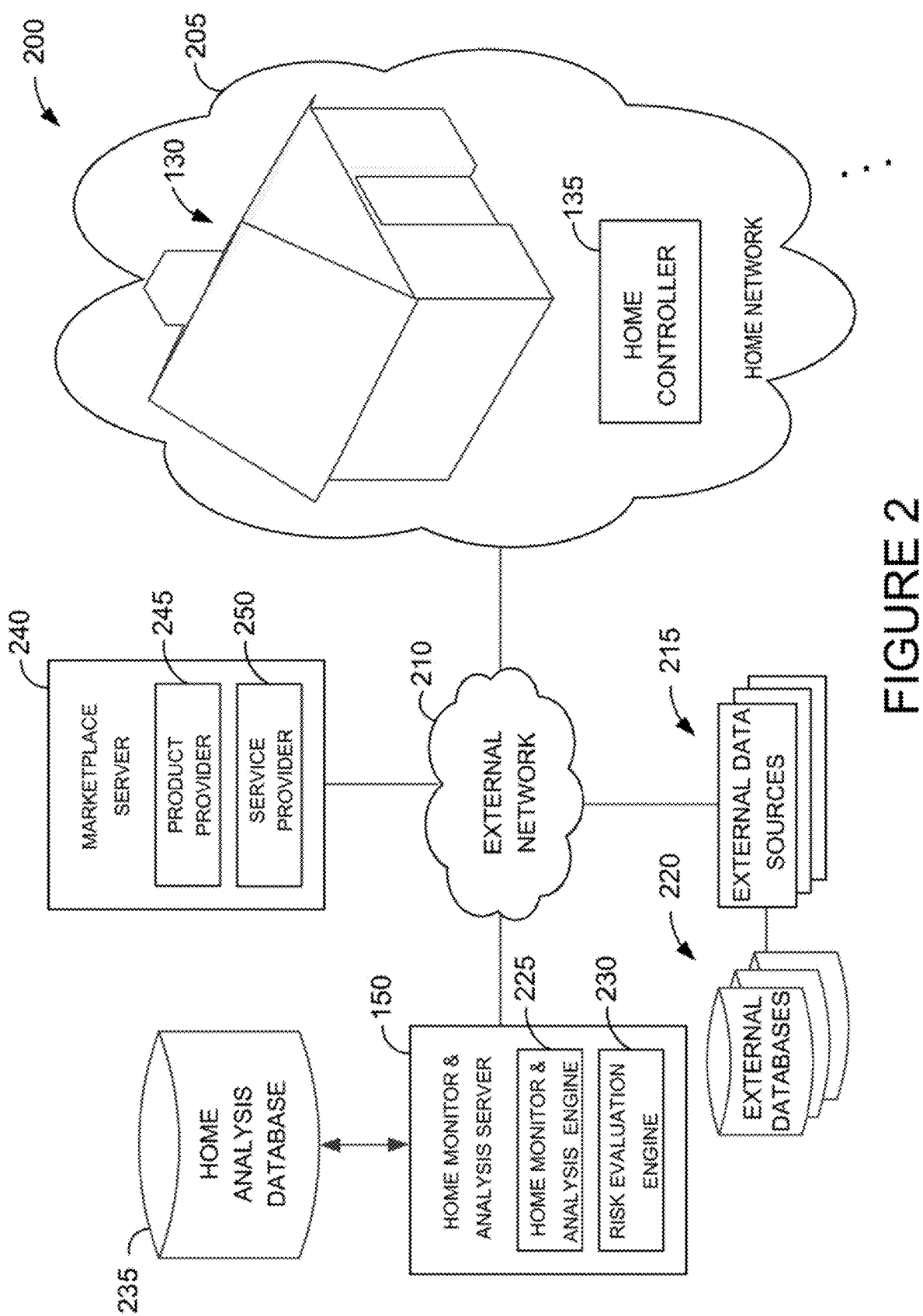
FIG. 2 illustrates an expanded home monitoring, analysis, and marketplace system, including the system of FIG. 1, that may be used for evaluating a home and home appliances and evaluating risks associated with a residential house and appliances within the house and providing solutions to mitigate those risks.

FIG. 2 illustrates an expanded system 200 that may be used for evaluating appliances (e.g., IoT devices 110 and/or non-connected devices 112) in home 130 and providing recommendations for prolonging a lifetime of the appliances, in accordance with the present disclosure. In the exemplary embodiment, the system 200 includes server computing device 150 that may be remote from the home. Server computing device 150 may be configured to execute a home monitor and analysis engine 225 and a risk evaluation engine 230. The server computing device 150 may include or otherwise be in communication with a home analysis database 235 that stores information about the home 130 that may be used in part to evaluate the appliances installed in home 130, and may include information about real estate upon which the home 130 is located, assets contained within the home 130 (e.g., IoT devices 110 and/or non-connected devices 112), and various data points that may influence the various factors that may influence the lifetime of appliances installed in home 130 described herein. The terms "house," "home," and "residential property" may be used interchangeably herein to refer to the home 130 and its various property and assets.

In the exemplary embodiment, the server computing device 150 is in networked communication with a home controller (or just "controller") 135 of the home 130 through an external network 210 (e.g., the Internet). The home controller 135 may manage aspects of home health data collection, computations, and alerting as a part of system 100. The home controller 135 is connected to a home network 205 of the home 130 which allows communication with server computing device 150 through an external network 210 (e.g., the Internet). For example, the home 130 may include a local area network ("LAN"), a wireless network (e.g., Wi-Fi network), or some combination thereof that connects to the external network 210 (e.g., via a subscription service to an Internet service provider, or the like). In some embodiments, the home controller 135 may communicate via a wireless mobile network, such as a 3G, 4G, or 5G network.

The home network 205 may allow various devices within the home 130 to communicate over the home network 205, such as computing devices and Internet-of-Things ("IoT") type devices 110 (shown in FIG. 1) (e.g., smart sensors, smart appliances, or the like). Such IoT devices 110 may be referred to herein as "connected home devices," in that they are associated with the home 130 or otherwise a part of the home network 205. Some IoT devices 110 may participate in system 100 and/or system 200, for example, providing home data that may be used (e.g., by server computing device 150) to evaluate appliances installed in home 130, to generate risk scores, determine matches in the marketplace server 240, or other uses described herein.

In the exemplary embodiment, the systems 100 and 200 may allow homeowners to opt into or out of various aspects of data collection from IoT devices 110 (e.g., by device type, by type of data collected, by data use). For example, the homeowner may be presented with an individual login to the system 100 and 200 which may include an opt-in screen that allows the homeowner to view data collection and usage policy and select whether they wish to allow such usage, thereby protecting privacy of the homeowner. Home data generated by such IoT devices 110 may be referred to herein as just "home data."

Server computing device 150, in the exemplary embodiment, may collect some home data from one or more external data sources 215. The home monitor and analysis engine 225 or the risk evaluation engine 230 may, for example, collect data from publicly available sources or from private third-party sources about the particular subject home 130 or the area in which the home 130 is built (referred to herein as "the locality of the home"). For example, one external data source 215 may be the national weather service ("NWS"), a branch of the national oceanic and atmospheric administration ("NOAA"). The NWS collects, and makes publicly available, weather data for the United States of America and its outlying countries.

The system 100 and 200 may collect aspects of historical, current, or predictive weather data for a locality of the home 130 (e.g., storm, wind, lightning, flooding in the locality) and may use such data to, for example, evaluate the appliances installed in home 130. Such data from external data sources 215 is referred to herein as "external data." Some external data sources 215 may maintain such external data in one or more external databases 220. Other examples of external data sources 215 and external data may be provided by manufacturer server 105 (shown in FIG. 1) in addition to those provided below, as well as various uses for such external data. For certain types of appliances, such as a pool or solar energy system, such external data (e.g., weather data) may be a particularly important factor in determining a predicted remaining lifetime.

In the exemplary embodiment, server computing device 150 is in communication with a marketplace server 240 through the external network 210. The marketplace server 240 is a platform where businesses and/or individuals come together to sell products and services to the customer base of homeowners. The marketplace server 240 and server computing device 150 determine the needs of the users and then determines which product providers 245 (e.g., stores or individuals who have listed products for sale) and service providers 250 that may be of assistance to the user. For example, if an appliance needs to be repaired, server computing device 150 may identify a service provider 250 that can perform the needed repair and provide a link to communicate with the service provider 250 to the homeowner (e.g., using user device 140). Similarly, if an appliance needs to be replaced, server computing device 150 may identify a product provider 245 that can provide a replacement and provide a link to communicate with the product provider 245.

In the exemplary embodiment, server computing device 150 may be operated by an insurance provider that provides insurance coverage for the home 130 (e.g., via a home insurance policy) or that provides participation in systems 100 and 200 as a home protection service for the homeowner. The insurance provider may be any individual, group of individuals, company, corporation, or other type of entity that may issue insurance policies for customers, such as a homeowners, renters, or personal articles insurance policy associated with the home 130 or an insured. For example, after signing up for a home insurance coverage, the insurance provider may provide the home controller 135 for installation in the home 130.

Although the present disclosure describes the systems and methods as being facilitated in part by the insurance provider, it should be appreciated that other non-insurance related entities may implement the systems and methods. For example, an appliance manufacturer and/or general contractor may aggregate the insurance-risk data across many properties to determine which appliances or products provide the best protection against specific causes of loss, or deploy the appliances or products based upon where causes of loss are most likely to occur. Accordingly, it may not be necessary for the home 130 to have an associated insurance policy for the property owners to enjoy the benefits of the systems and methods.

The home controller 135, as discussed in greater detail below, may be configured to collect home data from sensors, appliances, or other devices within the home 130, connect to the home network 205, and communicate with server computing device 150 and/or marketplace server 240. The home controller 135 may be configured to connect to the home network 205 and communicate with other networked IoT devices 110 (or "smart devices") within the home 130. Such IoT devices 110 may be referred to herein as "source devices," "connected devices," or "IoT devices," as devices that provide home data to the systems 100 and 200. In some embodiments, server computing device 150 may communicate directly with some or all of the source IoT devices 110 within the home 130. Further, information about non-connected devices 112 may be provided to home controller 135 and/or server computing device 150 as described herein for use in evaluating home 130 and/or the appliances installed in home 130 (e.g., including IoT devices 110 and/or non-connected devices 112) as a whole. Various source devices are illustrated in further detail below with respect to FIG. 3.

In the exemplary embodiment, server computing device 150 provides the users access to the marketplace, while using ML and AI to determine which product providers 245 and service providers 250 are the most relevant to the user based on the analysis of their home and appliances installed in the home. In at least some embodiments, server computing device 150 determines different attributes and/or conditions of the appliances based on the home data provided from IoT devices 110 and/or the external data sources 215. Server computing device 150 may use the different attributes and/or conditions of the home and appliances installed in the home to build a digital property profile of home 130. The digital property profile may be displayed to the user, such as through a dashboard, that shows, for example, each of the appliances installed in home 130, predicted remaining lifetimes related to the appliances, maintenance recommendations for the appliances, links to product providers 245 and service providers 250 relating to the recommendations, risk or insurance scores, and/or other information describe herein. The digital property profile may be provided through a mobile app that allows a user to search for their home address and see a dynamic "Home Profile Dashboard" that includes a personalized recommendation and/or marketplace.

Exemplary Source Devices

Figure 3:
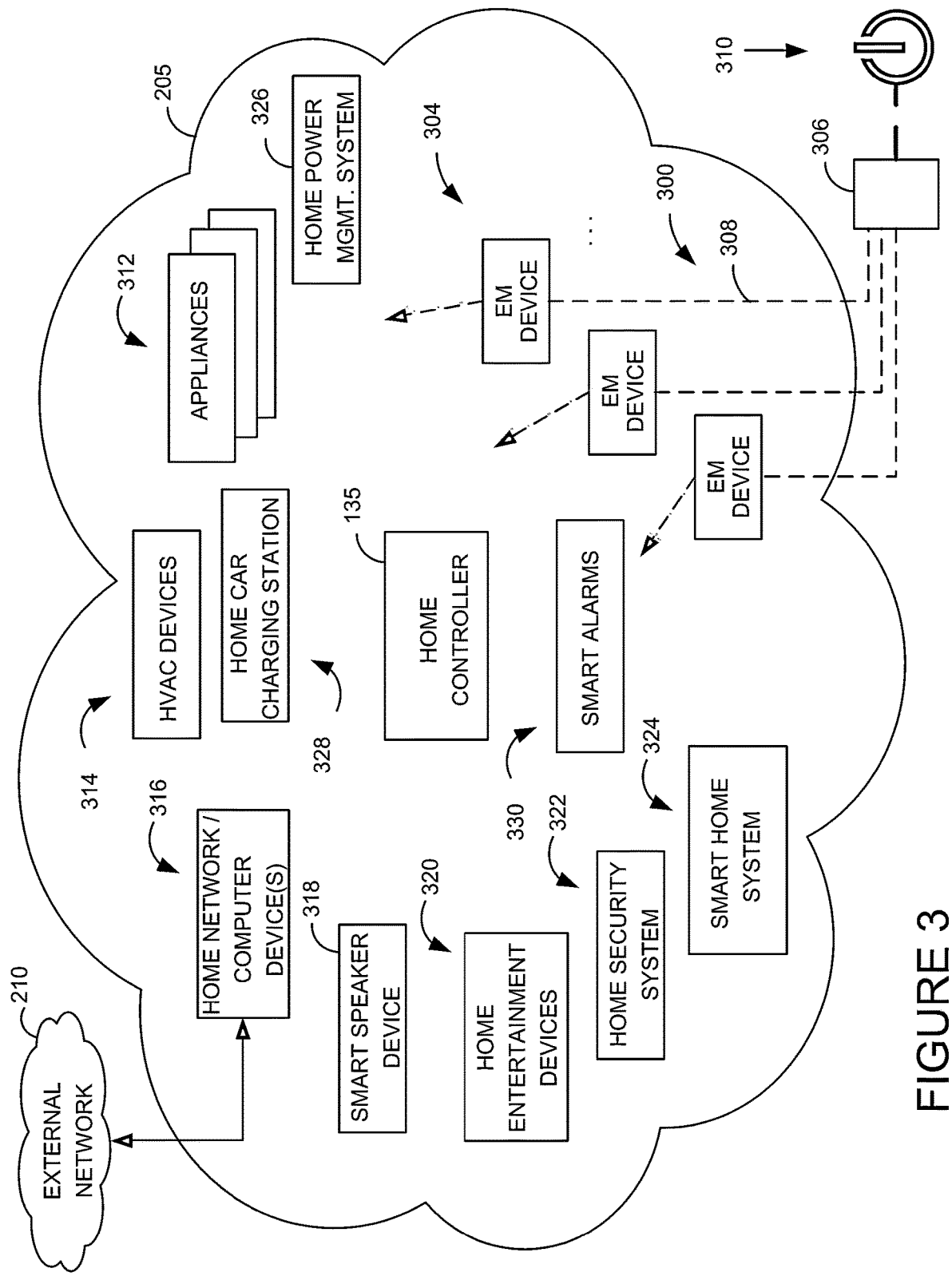
FIG. 3 illustrates exemplary source devices that may be used with the systems shown in FIGS. 1 and 2.

FIG. 3 illustrates exemplary source devices that may be used with the system 100 (shown in FIG. 1) and the system 200 (shown in FIG. 2). In the exemplary embodiment, the home controller 135 is in communication with or otherwise monitors or collects data from a variety of source devices within the home network 205. The home 130, and the various source devices therein, may be powered by an electrical distribution system 300. Paths of electrical power flow are illustrated in FIG. 3 in broken lines. The electrical distribution system 300 includes multiple electrical circuits 308, each of which may provide power to one or more of the source devices or other IoT devices 110 within the home 130. Each of the example circuits 308 emanate from an electrical distribution panel 306 that receives power from a power source 310, such as a utility power company or an on-premise power source (e.g., gas generator, solar generator, wind generator). Each circuit 308 may include a circuit breaker for each circuit 308 in the electrical distribution panel 306. While not expressly shown, any of the various source IoT devices 110 and/or non-connected devices 112 (not shown in FIG. 3) may be connected to and powered by the electrical circuits 308.

In the exemplary embodiment, the systems 100 and 200 may include one or more electricity monitoring ("EM") devices 304. EM devices 304 may be used to monitor electricity flowing to individual electric devices, such as smart devices or appliances, electronics, vehicles, or mobile devices, and may be configured to monitor or detect abnormal usage or trends. Abnormal electricity flow ("EF") to various devices may indicate that failure is imminent, maintenance or device replacement is needed, de-energization is recommended, or other corrective actions are prudent. For example, the EM devices 304 may be TING® smart sensors such as those made commercially available by Whisker Labs of Germantown, MD.

EF data collected by the EM devices 304 may include data indicative of electricity flow to or from various smart or other IoT devices 110 and/or non-connected devices 112, including the various devices shown here in FIG. 3. EF data may also include electricity or energy usage for each electronic component, device, outlet, circuit, or the like, within the home 130, such as data indicating the electricity each device or room is using. For example, energy usage of air conditioners, washers, dryers, dish washers, refrigerators, stoves, ovens, microwave ovens, televisions, lamps, outlets, computers, laptops, mobile devices, other electronic devices, may be determined by the EM device 304.

EF data may be used to detect hazards or other abnormalities that may be correlated with a reduced lifetime of the powered appliances and/or indicate a risk to the home 130 or its assets. For example, changes in electrical consumption (e.g., drawing more power and/or current than usual) of IoT devices 110 and/or non-connected devices 112 may indicate that IoT devices 110 and/or non-connected devices 112 are having problems that may influence a lifetime of IoT devices 110 and/or non-connected devices 112. Accordingly, EF data collected by the EM devices may be fed into the AI model as a factor in determining appliance lifetime and generating recommendations to extend the lifetime.

EM devices 304 may include sensors that are configured to monitor and collect EF data. EM devices 304 may be plugged into electrical outlets within the home (e.g., conventional 110-volt outlets) for at least powering the EM device 304, IoT devices 110, and/or non-connected devices 112, or may be electrically wired into a circuit 308 for powering the EM device 304, IoT devices 110, and/or non-connected devices 112. Further, some EM devices 304 may collect EF data directly from a circuit 308 (e.g., via wired connection to the circuit 308, referred to herein as "direct sensing") and some EM devices 304 may wirelessly collect EF data from circuits 308, appliances, or other electricity consuming devices (referred to herein as "wireless sensing"). Wireless sensing may include, for example, sensors within the EM device 304 that are configured to sense electromagnetic waves or an electrical signature of the electrical devices receiving power from the electrical distribution system 300. The EM devices 304 may directly or wirelessly detect each flow of electricity to or from each different electronic device by identifying each electronic device by its unique electronic or electrical signature (or "fingerprint"). The EM devices 304 may then generate electricity usage or flow data for each electronic device within the home, or connected to the electrical distribution system 300 (such as a hybrid or fully electric vehicle having its battery directly or wirelessly charged by the home's electrical system). In some embodiments, EM devices 304 may be positioned in vicinity of the electrical distribution panel 306 and may capture electrical activity about the home 130 and/or appliances installed in the home 130 by wirelessly detecting an electricity flow to devices that are coupled to the electrical distribution panel 306.

In other embodiments, EM devices 304 may be positioned in vicinity of the electrical distribution panel 306, but not hardwired to the electrical distribution panel 306 or home electrical wiring system, and may capture electrical activity about the home 130 and/or appliances installed in the home 130 by wirelessly detecting an electricity flow to devices that are coupled to the electrical distribution panel 306. In other embodiments, EM devices 304 may be plugged into electrical outlets positioned throughout a home.

During operation, as one or more of the electric devices receives electricity via the electrical distribution system 300, each device may be differentiated by an electrical signature that is unique to a respective device (such as by one or more EM devices 304 monitoring, detecting, and/or analyzing the electricity flowing to or being consumed by each respective electric device, and/or by monitoring EF data generated or collected by one or more EM devices 304).

In other words, transmission of electricity to a refrigerator, for example, may be differentiated from transmission of electricity to an electric stove (such as via one or more EM devices 304 and/or analyzing the EF data generated or collected by one or more EM devices 304). Furthermore, transmission of electricity to a television on one circuit 308 or outlet, for example, may be differentiated from transmission of electricity to another recipient electric device (e.g., a cable television box) via the same circuit 308 or electrical outlet. The systems 100 and 200 may correlate electrical activity with a variety of electric devices on the electrical distribution system 300 based upon electrical signatures unique to each respective device. The systems 100 and 200 may build a structural electrical profile for the home 130, which may include data indicative of operation of the various electric devices within or around the home 130 (e.g., over a period of time), such as by using EF data generated or collected by one or more EM devices 304 over a period of time. In some embodiments, the electrical profile may further be used in identifying specific models of appliances to be added to the digital home profile.

In some embodiments, an EM device 304 may be affixed to or situated near the electrical distribution panel 306. Generally, the EM device 304 may utilize the unique, differentiable electrical signatures of the electric devices by directly or wirelessly monitoring electrical activity including transmission of electricity via the electrical distribution panel 306 to one or more of the electric devices. Monitoring of transmission of electricity to an electric device receiving the electricity may include, for example, monitoring (i) the time at which the electricity was transmitted, (ii) the duration for which the electricity was transmitted, and/or (iii) the magnitude of the electric current in the transmission.

Based upon the unique electrical signatures of the various electric devices of the home 130, the monitored electrical activity may be correlated with respective electric devices receiving the electricity transmitted via the electrical distribution system 300. Further, electrical activity associated with other components of the electrical distribution system 300 (e.g., the electrical distribution panel 306, the circuits 308, or the like) may be correlated with one or more electric devices to which the electrical activity also pertains. In some embodiments, the EM device(s) 304 may perform the correlation or other functions described herein, via one or more processors of the EM device(s) 304 that may execute instructions stored at one or more computer memories of the EM devices 304. In other embodiments, the EM devices 304 may collect the EF data, and the correlation and/or other functions described herein may be performed at another system (e.g., the home controller 135 or server computing device 150), which may receive data or signals indicative of monitored electricity or other data via one or more processors or through transfer via a physical medium (e.g., a USB drive). Correlation of the electrical activity with the respective electrical devices may produce data indicating, for example, the time, duration, and/or magnitude of electricity consumption by each of the electric devices during a period of electrical activity monitoring.

Based upon at least the correlated electrical activity, a structure electrical profile may be built and stored at the EM devices 304 or at some other system (e.g., the home controller 135 or the home analysis database 235). The structure electrical profile may include, for each of the electric devices about the home 130, data indicative of operation of the respective electric device during at least the period at which the EM devices 304 monitored electrical activity about the home 130. Based upon the correlated electrical activity, the structure electrical profile may depict, for example, average electricity operation/usage, baseline electricity operation/ usage, and/or expected electricity operation/usage/consumption. In effect, the structure electrical profile, based upon electrical activity about the structure, may set forth what is "normal" operation and usage of electricity about the structure.

Thus, once the structure electrical profile is built, any electrical activity monitored via the home controller 135 and the EM device(s) 304 may be analyzed to determine whether electrical activity is abnormal and/or otherwise indicative of a condition that my affect the lifetime of the electric devices. In response to the abnormal electrical activity, among other possible factors, corrective actions to prolong the lifetime of the device, mitigate damage, prevent damage, and/or remedy the cause of the abnormal electrical activity the situation may be determined and/or initiated. Some possible corrective actions are discussed herein.

EF data regarding an electric device may include, for example, historical data indicating the electric device's past operation patterns or trends. For example, historical data may indicate a time of day, day of the week, time of the month, etc., at which an electric device frequently uses electricity (e.g., a lighting fixture may not use electricity during late night hours of the day). As another example, historical data may include the electric device's total electricity consumption or usage rate over a period of time. Additionally or alternatively, historical data may include data indicating past events regarding the electric device (e.g., breakdowns, power losses, arc faults, etc.). Additionally or alternatively, operation data regarding an electric device may include an expected electricity consumption or baseline electricity consumption for the electric device. For example, in the case of a refrigerator, the refrigerator's electricity consumption during a first period of monitoring may be reliably used to approximate an expected electricity consumption at a later time. Changing electricity consumption over time (e.g., the refrigerator's consumption is greater than expected for a period) may indicate that the refrigerator is in need of repair and/or maintenance and/or may be nearing an end of its life.

Further, the structure electrical profile may include data pertaining to the structure as a whole. For example, the structure electrical profile may include data reflecting a total electricity or average usage rate over a period of time. As another example, the profile may include time-of-day, day-of-week, etc., data reflecting times at which the home 130 as a whole uses more or less electricity. Further, the profile may detail specific types, classes, or specifications of electric devices that behave differently or consume a different amount of electricity compared to other electric devices within the home 130. Further, the profile may detail specific risks determined to be relevant to one or more of the electric devices or to the home 130 as a whole, based upon the electrical activity of the electric devices.

Furthermore, the structure electrical profile may include a digital "map" of the home 130. A home map may indicate spatial locations of the electric devices, and/or spatial relationships between two or more of the electric devices. Such mapping may indicate, for example, a risk associated with the spatial placement of a stove, and/or a risk associated with placing a refrigerator adjacent to the stove. Additionally or alternatively, the home map may indicate which of the electric devices are connected to each electrical circuit 308 within the electrical distribution system 300 of the home 130. Such mapping may indicate, for example, a risk of overloading a particular circuit 308 based upon a number or intensity of electric devices connected to the circuit 308. As another example, the home map may be used to determine what electric devices may lose power if a particular circuit 308 were to be de-energized (e.g., due to risk or abnormal electrical activity associated with one electric device on the circuit).

In some embodiments, the home map may be configurable by a user (e.g., the homeowner of the home 130). The user may, for example, configure the map via an I/O module (e.g., screen, keypad, mouse, voice control, etc.) of the home controller 135, or via an I/O module of another computing device, which may transmit the home map to the home controller 135. Additionally or alternatively, the home map may be stored at one or more computer memories of another system (e.g., server computing device 150).

In some embodiments, the home network 205 may include a home power management system 326. The home power management system 326, or home controller 135 in conjunction with the EM devices 304, may collect power consumption data on the circuits 308 (e.g., via EM devices 304) or device electrical usage data of various electronic devices within the home 130. The home power management system 326 may, for example, collect usage data for lights or appliances within the home 130, giving an indication of how much electricity the home 130 uses or how frequently occupants are at home. In some embodiments, the home 130 may include one or more smart plugs (not separately shown) which may be managed by home power management system 326, the smart speaker device 318, the smart home system 324, or otherwise by the systems 100 and 200 (e.g., for activating or deactivating devices plugged into the circuits 308 via the smart plugs, such as via 110-volt outlets).

The home power management system 326 may identify and provide details on what appliances or other consuming devices are within the home 130 (e.g., manufacturer make and model), thereby allowing the systems 100 and 200 to identify some property on the premises (e.g., device identification and verification, device count), evaluate value of devices (e.g., replacement costs), or collect manufacturer-provided or consumer protection-provided details regarding the devices from external data sources 215 (e.g., susceptibility of the device to power surges, likelihood of fire caused by the device, mean time to failure of the device, types of device failures, power consumption profiles and tolerances of the device, or the like).

The home power management system 326 may collect power quality data for the home 130, such as occurrences and frequency of power outages or reductions in service (e.g., black-outs or brown-outs), loading at various times throughout the day or week, the size of service, occurrences of voltage values fluctuating beyond tolerance ranges (e.g., spikes), or the like. In some embodiments, the home power management system 326 may include one or more smart circuit breakers (e.g., on any or all of the circuits 308) or a smart panel (e.g., as the electrical distribution panel 306), such as those made commercially available by Schneider Electric (Paris, France), which may provide circuit-level data and operations such as, for example, current or historical circuit load data, circuit breaker status, or turning circuit breakers on or off. Such power data may be used to construct a power profile for the home 130. In some embodiments, the home controller 135 may perform any such power monitoring and data collection operations in lieu of, or in addition to, the home power management system 326.

In the exemplary embodiment, the home 130 may include one or more smart appliances 312 (e.g., appliances that can communicate via the home network 205, which may include IoT devices 110). Smart appliances 312 may include, for example, dish washers, microwaves, stove tops, ovens, grills, clothes washers and dryers, water heater, water meter, water softener or purifier, smart lighting, smart window blinds or shutters, piping, interior or yard sprinklers, or the like. The home controller 135 may be configured to communicate with such smart appliances 312 and may collect home data from such appliances for the systems 100 and 200.

For example, smart appliances 312 may provide data such as device data (e.g., manufacturer, make, model, date of manufacturer, date of installation, software or firmware versions), usage data (e.g., daily usage time, power consumption), or log data (e.g., log events, alerts, component failure detections, maintenance history, or the like). Such appliance data may allow the systems 100 and 200 to detect which appliances are present in the home 130 (broadly, as a part of an "asset inventory" of the house), their replacement value, age of each appliance, a maintenance history of each appliance, to detect when appliances or their components are failing.

Electrical distribution system 300 may use such data, for example, to construct the power profile for the home 130, to compute an expected remaining lifetime for the appliances, to compute a risk for the home 130 and/or the appliances, to compute in an insurance profile for the home 130 (e.g., as factors of risk to lightning or other hazards), or to alert the homeowners when an appliance registers a failure. An appliance's electrical usage and/or power profile may be compared to those of other homes and/or appliances to see if maintenance or replacement is needed for the appliance.

In the exemplary embodiment, the home 130 may also include smart HVAC devices such as, for example, a heater (e.g., a gas or electric furnace), an air conditioner, an air purifier, an attic fan, a ceiling fan. Some or all such devices may be controlled by a thermostat device. Such devices are collectively referred to herein as HVAC devices 314, some of which may not be smart devices but may nonetheless be controlled in some aspects by the thermostat device.

The systems 100 and 200 may collect HVAC data such as device data (e.g., manufacturer, make, model, date of manufacturer, date of installation), usage data (e.g., daily usage time, power consumption), or thermostat data (e.g., temperature settings, daily schedule profiles). The systems 100 and 200 may use such data, for example, to construct the power profile for the home 130, to compute an expected remaining lifetime for the HVAC devices, to compute a risk for the home 130 (e.g., determining how often the home 130 is typically occupied), to compute in an insurance profile for the home (e.g., as factors of risk to lightning or other hazards, likelihood of equipment failures), or to alert the homeowners when an HVAC device registers a failure.

The home 130, in the exemplary embodiment, may also include various computing devices such as, for example, desktop or laptop personal computers, tablet computers, servers, or networking devices (e.g., Wi-Fi routers, switches, hubs, firewalls, or the like), all of which are collectively represented here as home network/computer devices (or just "computer devices") 316. The networking devices may provide some or all of the home network 205 that is used to facilitate communication between the devices shown here. The home controller 135 may be configured to capture computer device data from some or all of these home network computer devices 316 such as, for example, a number and type of computing devices (e.g., hardware manufacturer, make, model, and the like), hardware and software profile of computing devices, configuration data of computing devices (e.g., software versions, firmware versions), usage data, and log data (e.g., firewall logs, access logs, software patch logs, error logs). The systems 100 and 200 may use such data to, for example, determine asset inventory and valuation, construct the power profile for the home 130 (e.g., average daily usage), alert the homeowners when devices need software or firmware upgrades (e.g., critical security alerts) or upon intrusion detection or other compromise of home network computer devices 316 (e.g., software hacks).

In the exemplary embodiment, the home 130 may include a smart speaker device(s) (or "nest device") 318 that may interact with occupants of the home 130 (e.g., via audible commands and responses, digital display, executing preconfigured actions). Some example smart speaker devices 318 include the Echo® devices (Amazon Inc., of Seattle, Washington) and the Google Nest® devices (Alphabet Inc., of Mountain View, California), to name but a few. The smart speaker device 318 may include a speaker for providing audio output, a microphone for receiving audio input (e.g., commands spoken by the occupants), and may include a display device for video output or a camera device for capturing video input. The smart speaker device 318 may be configured to interact with other smart devices, such as for controlling lighting within the home 130, the thermostat (e.g., changing thermostat settings), home security devices of a home security system 320 (e.g., locking and unlocking smart locks on doors, opening or closing garage doors, or the like), or entertainment devices of a home entertainment system 326 (e.g., enabling, disabling, or reconfiguring music or television devices).

The systems 100 and 200 may, with owner configuration and permission, utilize inputs from the smart speaker device 318 to, for example, determine a number of unique occupants of the home 130 (e.g., via unique speech profile or video identification), determine the number of children in the home 130 (e.g., via audio or video analysis), determine when occupants of the home 130 are currently or historically present (e.g., via noise detection, video movement), determine when other devices are turned on or off, determine presence of pets (e.g., via unique audio sounds or video identification of the pets), or smoke or carbon monoxide alarm detection (e.g., via audible sound). Such raw data may be sanitized or distilled by the home controller 135 into refined data before sending to server computing device 150 in an effort to protect privacy of the home occupants while still providing home health evaluation and risk capabilities (e.g., sending results determined from the raw audio or video data and deleting the raw audio or video data). The systems 100 and 200 may anonymize personal data, thereby allowing data to be stored or used without direct attribution of data to a particular homeowner.

In the exemplary embodiment, the home 130 may include various home entertainment devices 320 such as, for example, televisions, digital video recorders ("DVR"), radios, amplifiers, speakers, remotes, or console gaming systems, any or all of which may be smart devices in communication with the home network 205 and home controller 135. Home controller 135 may collect home entertainment data from such devices and may use that data, for example, to construct the power profile for the home 130, to compute an expected remaining lifetime for the appliances in the home 130, to construct the asset inventory of the home 130, to compute a risk score for the home 130, to compute in an insurance profile for the home (e.g., as factors of risk to lightning or other hazards, likelihood of equipment failures).

The home 130, in the exemplary embodiment, may include a home security system 322. The home security system 322 may include security devices such as, for example, door or window sensors (e.g., to detect when doors or windows or open, when windows are broken), motion sensors (e.g., to detect when someone is present within range of the sensor), security cameras (e.g., for capturing audio/video of particular areas in or around the home 130, such as a doorbell camera), key pads (e.g., for enabling/disabling the security system), panic buttons (e.g., for alerting a security service or authorities of an emergency situation), security hubs (e.g., for integrating individual security devices into a security system, for centrally controlling such devices, for interacting with third parties), electric door locks, or smoke/fire/carbon monoxide detectors. Such "security devices" broadly represent devices that can detect potential contemporaneous risks to the home 130 or its occupants (e.g., intrusion, fire, health).

The home security system 322 may be configured to communicate with a third-party security service or local authorities, and may transmit alerts to such parties when events are detected. The home controller 135 may be configured to receive alert data from the home security system 322 and may transmit such alerts to server computing device 150, create historical logs of security events, or transmit alert events directly to the homeowner (e.g., via SMS text message or the like) or to local authorities, fire protection, or emergency services. The systems 100 and 200 may use such security alert events to, for example, determine how frequently security events occur (e.g., as a factor for risk), how often such events are warranted (e.g., authentic risks rather than false alarms), or the type and nature of such authentic risks or false alarms.

The systems 100 and 200 may use raw data collected directly from any of these security devices. All of this raw data can be used for predicting remaining lifetimes for these appliances and other appliances within the home. For example, the home controller 135 may use raw data from the motion sensors to detect when the home 130 is occupied (e.g., to build a profile of occupancy times), may use raw data from the camera devices or door devices to detect when occupants enter or exit the home 130, may use the camera devices to determine a number of occupants of the home 130 or a number and type of pets in the home 130. The home controller 135 may determine information about the home security system 322 installed within the home, such as a number and type of security sensors installed within the home 130, a type of home security system 322 installed in the home (e.g., third-party service provider, device manufacturers, types of security protection implemented within the home), or how often the homeowners leave the home 130 unoccupied without activating the home security system 322 (e.g., as a factor in risk calculations or home health scoring). The systems 100 and 200 may rate the home security system 322 and associated devices and services to generate a home security protection rating (e.g., relative to other available security systems or hardware) and may use that rating as a factor in risk calculations or in preparing a risk mitigation proposal (e.g., for more or better devices or security systems).

In some embodiments, the home 130 may include a smart home system 324 (e.g., a home monitoring system) that allows the homeowner and occupants to control various devices within the home 130. For example, the smart home system 324 may be configured to control, inter alia, devices such as the smart appliances 312, HVAC devices 314, home entertainment devices 320, or home security system 322. In the exemplary embodiment, the home controller 135 may be configured to interact directly with such devices as described herein ("direct access"), or may be configured to perform some interactions and data collections with such devices through the smart home system 324 ("proxy access"). For example, any or all of the data collections or operations described herein may be performed by the smart home system 324 based upon commands received from the home controller 135, thereby allowing the systems 100 and 200 to perform such operations through the smart home system 324 acting as a proxy for some such operations.

In the exemplary embodiment, the home 130 may include a home car charging station 328 that may be used to recharge electric vehicles. The home car charging station 328 may draw power from one or more of the circuits 308 of the electrical distribution system 300 and may include an on-premise power source (e.g., solar panels, wind generator, or the like) or a dedicated battery bank (e.g., for storing excess power from the local energy source). The systems 100 and 200 may capture various charging station data from the home car charging station 328, from the circuits 308 used for home car charging station 328, or from the local power source device(s).

In the exemplary embodiment, the home 130 may include one or more smart alarms 330 that are configured to detect various conditions within the home 130 and may alert the homeowner or other occupants (e.g., via audible alarm, SMS text message, email, or the like). Smart alarms 330 may include, for example, smoke detectors, carbon monoxide detectors, carbon dioxide detectors, or indoor air quality ("IAQ") monitors or systems that include sensors configured to, for example, detect dangerous conditions such as fire or buildup of carbon monoxide, the presence of dangerous pollutants such as radon or various volatile organic compounds ("VOC"), or collect various air quality data such as temperature and humidity. Smart alarms 330 may include water leak detectors or flood alarms that may be configured to detect the presence of water at various areas in the home 130, such as near HVAC equipment, water tanks, sump pumps, below showers or bath tubs, around basement perimeters, behind or within basement walls, or the like. Such water detectors may identify leaks within plumbing or appliances within the home 130 or ingress of water into the home 130 (e.g., rain water, flooding, failing sump pump, foundation cracks, or the like).

System 100 may collect alarm data from the smart alarms 330 and may perform automatic alerting based upon sensor events registered at such smart alarms 330 (e.g., alerting emergency services, homeowner, or the like, in an effort to protect life and property, mitigate damage, or such) or initiate automatic actions (e.g., shutting off water flow within the home 130, or within a particular segment of plumbing, via activating a smart water shut off valve, not separately shown). The systems 100 and 200 may identify the presence of such smart alarms 330 or shut off valves in the home 130 when configured to communicate with the smart alarms 330 and may automatically provide policy discounts when particular smart alarms 330 are detected as present or may include the presence or absence of such smart alarms 330 in the various aspects of home health scoring. Furthermore, server computing device 150 may be configured to provide marketplace suggestions of provides to assist with the issues that are associated with the alarms.

Data received from smart alarm 330 may be used to detect hazards or other abnormalities that may be correlated with a reduced lifetime of the powered appliances, a need to repair or replace certain IoT devices 110 and/or non-connected devices 112, and/or indicate a risk to home 130 or its assets. For example, if smart alarm 330 is triggered based on poor air quality in home 130, it may be determined that there is an issue with certain appliances such as HVAC devices 314, fans, and/or air purifiers, or that the lifetimes of certain IoT devices 110 and/or non-connected devices 112 that may be damaged by poor air quality may be affected. Accordingly, data from smart alarms 330 may be fed into the AI model as a factor in determining appliance lifetime and generating recommendations to extend the lifetime.

Exemplary External Data Sources

In the exemplary embodiment, and referring now to FIG. 2, the system 200 may collect various types of external data from external data sources 215 that may be used, for example, for predicting a remaining lifetime of appliances in home 130, or other various uses described herein. For example, the machine learning model or AI model may identify correlations between any of the data types described herein and a lifetime of an appliance, and therefore may use any of these data sources as factors in predicting the expected remaining lifetime as a particular appliance. Some external data sources 215 may provide publicly available data, where other external data sources 215 may be private, third-party sources. External data sources 215 may include an insurance provider that provides insurance policies to the homeowner and various data available or otherwise collected by that insurance provider. In some embodiments, server computing device 150 may be operated by the insurance provider and the data may include data private to the insurance provider (e.g., customer data, policy information, or other proprietary information).

In the exemplary embodiment, one example external data source 215 is the NOAA or any of its various branches (e.g., the national weather service). The NOAA makes various weather data publicly available. As such, the system 200 may collect weather data from the NOAA. Such weather data may be refined to a particular geography, such as a state, county, city, or other geographic region. The system 200 may, for example, identify a geographic region of the home 130 and submit data queries to the NOAA for weather data specific to that geographic region. Such data queries may include requests for historical data such as average rainfall, storm occurrences, wind strengths, lightning strikes, temperatures, tornado events, or the like. Data queries may include requests for forecast data such as severe watches warnings, tornado watches or warnings, flooding watches or warnings, precipitation predictions, wind predictions, lightning event predictions, blizzard warnings, or the like. Forecast data may be used to, for example, generate and send weather alerts to the homeowner or occupants of the home 130 or determine how frequently the home 130 experiences various warnings or alerts over time. In some embodiments, the machine learning model or AI model may identify correlations between weather data and a lifetime of an appliance, and therefore may use such data as a factor in predicting the expected remaining lifetime as a particular appliance.

In the exemplary embodiment, another example external data source 215 may be the U.S. Forest Service. The U.S. Forest Service maintains historical data related to forest fires and tracks active forest fires in the United States. As such, system 100 may collect forest fire data from the U.S. Forest Service. Such forest fire data may similarly be refined to a particular geography, such as a state, county, city, or other geographic region. The system 200 may, for example, collect historical forest fire data for the geographic region of the home 130, or may collect current forest fire data at or near the location of the home 130 (e.g., within a pre-defined distance from the home, within a distance from a projected path of the forest fire). System 200 may use current forest fire data to, for example, generate and send forest fire alerts to the homeowner or occupants of the home 130, or as factors in home health scoring. In some embodiments, the machine learning model or AI model may identify correlations between forest fire data and a lifetime of an appliance, and therefore may use such data as a factor in predicting the expected remaining lifetime as a particular appliance.

In the exemplary embodiment, another example external data source 215 may be municipal power utilities. Electrical distribution system 300 may access current or historical power network data provided by power utility companies in various localities, such as power generation performance statistics (e.g., generation and load statistics), power transmission and distribution statistics or power outage information (e.g., across the network, local to a distribution segment that services the home 130, consistencies of voltages, power sags, power surges, brown-outs or black-outs and associated frequencies or lengths of outages, or the like), lightning strike data affecting the power network, or electrical consumption data for the home 130 (e.g., current or historical power usage, local power generation provided back to the network). System 100 may use current power network data to, for example, generate and send alerts to the homeowner during power outages (e.g., as SMS text messages or emails that can be viewed on mobile computing devices), or as factors in predicting a lifetime of an appliance. In some embodiments, the machine learning model or AI model may identify correlations between power network data and a lifetime of an appliance, and therefore may use such data as a factor in predicting the expected remaining lifetime as a particular appliance.

In the exemplary embodiment, another example external data source 215 may be third-party home data systems such as Multiple Listings Service ("MLS"), Zillow (www.zillow.com), or other Internet-accessible sources for property data. The system 200 may access such home data systems to collect construction details about the home 130 such as, for example, the age of the home, how many bedrooms and bathrooms the home 130 has, the type of any HVAC, the square footage of the home 130, the size of the property, market price of the home, whether the home 130 is constructed of wood, brick, concrete, or the like, the type and size of any garage, the quality of materials used to construct the home 130, whether the home 130 has a basement, the type, age, or condition of plumbing or wiring inside and outside the home 130, whether the home 130 has a pool and safety fence around the pool, the type of roofing, the floor plan, the architecture of the home 130 (e.g., ranch, two story, split foyer), the type of flooring, the type of exterior (e.g., wood, brick, siding), type of local power generation on the property (e.g., solar, wind, generator), number of fire places, type of fencing or gutters, whether the home 130 has a pool, sheds, patios, porches, or other exterior structures, whether the home 130 has outside doors having steps, type of ducting and insulation within the home 130, type of landscaping around the home 130, or mobility or accessibility options within the home 130.

Some home statistics data may include geographic data about the home 130 such as, for example, school district information (e.g., public school system, school ratings), utility providers available to at the location (e.g., electric, gas, sewer, waste, recycling, phone, Internet, television, fire, police, hospital, or other city services), proximity data to various services and amenities (e.g., distances from schools, parks, grocery, gas, library, or sources of entertainment), hazard data for the area (e.g., crime statistics, natural disaster statistics, ratings for emergency services), Some home statistics data may include historical data, such as price history (e.g., sales history, listings history), public tax history, insurance claims history, home warranty information, home inspection information, lease information (e.g., whether and how often the home 130 has been partially or fully rented or leased), or the like. Some home statistics data may include home energy data such as, for example, whether the home 130 is energy certified, type and size of power generation, home appliance or lighting energy certification data, or the like. In some embodiments, the machine learning model or AI model may identify correlations between property data and/or home statistics data and a lifetime of an appliance, and therefore may use such data as a factor in predicting the expected remaining lifetime as a particular appliance.

In the exemplary embodiment, another example external data source 215 may be an insurance provider or other service provider that has an economic or consumer relationship with the homeowner. The system 200 may access the service provider systems to collect demographic details about the home 130 and its occupants, such as, for example, names or ages of the occupants, education levels or occupations of the occupants, whether any of the occupants smoke, a family emergency plan, community engagement of the occupants, or whether a business is operated out of the home 130. The service provider system may collect home maintenance data about the home 130 such as, for example, maintenance logs of operations performed on the home 130 (e.g., service calls, property damage and fixes, routine device maintenance, cleanings, bug or pest service, lawn or garden service, roofing replacement, or the like), equipment installations and removals, device warranty information, or home improvements (e.g., new deck, pool, room(s), interior or exterior painting or weather proofing, solar installation, water reclamation systems installation, room remodeling, or the like). The service provider system may collect home configuration data about the home 130 such as, for example, whether GFCI outlets or LED lights are installed in the home 130, whether power strips supporting multiple devices are in use, whether the home 130 has exercise equipment, types of grills or fryers installed in the home 130, whether the home 130 includes particular safety equipment (e.g., smoke or carbon monoxide detectors, fire extinguishers, deadbolts on exterior doors, water sensors, sump pump, or the like), paint colors used on various walls of the home 130. In some embodiments, the machine learning model or AI model may identify correlations between maintenance data and a lifetime of an appliance, and therefore may use such data as a factor in predicting the expected remaining lifetime as a particular appliance.

In some embodiments, the service provider may be the operator of server computing device 150 and the homeowner may provide such data via an input interface (e.g., online questionnaire, user interface, service application, or the like, during participation in the home health system described herein). Collection and use of such data may be opted into by the homeowner on behalf of the occupants. In some embodiments, the system 200 may query the homeowner for any data elements described herein and not otherwise automatically accessed by the system 200.

In the exemplary embodiment, the system 200 may access aerial data of the home 130, such as satellite-, aerial-, or drone-captured overhead images of the home 130 and surrounding property. Such aerial data may be used to determine various externally visible features of home data (e.g., via digital image processing, machine learning, or human analysis). For example, system 200 may use aerial data to determine structural elements of the home 130 or surrounding property, such as whether the home 130 has a swimming pool, a fence, or a deck, how many garages the home 130 has, or the like. The system 200 may use aerial data to determine whether the home 130 has trees nearby (e.g., which may cause damage to the home 130) or whether the home 130 is located on a cul-de-sac or a busy road. Such aerial data may be provided by a third party or public external data source 215 (e.g., United States Geological Survey ("USGS"), National Aeronautics and Space Administration ("NASA"), NOAA, Google®, or the like) or may be privately collected (e.g., via aerial or drone photography of the home 130 by the insurance provider, realtor, or the like). Such aerial data may include global positioning system ("GPS") location data for the home 130. In some embodiments, the machine learning model or AI model may identify correlations between aerial data and a lifetime of an appliance, and therefore may use such data as a factor in predicting the expected remaining lifetime as a particular appliance.

The system 200 may train a model of satellite images of homes 130 with labeled data of the homes 130 indicating, for example, whether the homes 130 have pools, decks, nearby trees, or other such features. As such, the trained model may be configured to automatically evaluate an unlabeled home (e.g., the home 130 in FIG. 1) to determine whether such features are present or otherwise categorize the home 130 with respect to those features.

In some embodiments, the system 200 may access mapping data around the home 130 to determine various home health features. The system 200 may utilize a web mapping service (e.g., Google® Maps or the like) as an external data source 215. For example, the system 200 may access the web mapping service via an application programming interface ("API") that allows system 200 to submit, for example, the postal address of the home 130 or a GPS coordinate of the home 130 and query the web mapping service to provide features such as distances to nearby services (e.g., distance to nearest hospital, fire department, police station, schools, places of worship, parks, grocery stores, to various types of entertainment or other amenities, or the like). Mapping data may be used to determine whether the home 130 is situated on a busy or isolated road. The system 200 may generate a play score for the home 130 using the mapping data, where the play score evaluates proximity of the home 130 to various types of entertainment or exercise venues, such as proximity to hiking trails, bike paths, sports fields, professional sports venues, restaurants, theaters, or the like).

The mapping data may include ground-level imagery provided by the web mapping service that may be used by the system 200 to evaluate various externally visible features of home data (e.g., via digital image processing, machine learning, or human analysis). For example, the system 200 may use ground-level imagery to determine structural features of the home 130 such as a number of stories of the home, type of windows installed in the home, a roof type or type of exterior of the home, or how many garages the home has. The system 200 may train a model of ground-level images of homes 130 with labeled data of the homes 130 indicating, for example, how many stories or garages the homes 130 have, what type of exterior or roof type the homes 130 have, or other such features. As such, the trained model may be configured to automatically evaluate an unlabeled home (e.g., the home 130 in FIG. 1) to determine whether such features are present or otherwise categorize the home 130 with respect to those features. In some embodiments, the machine learning model or AI model may identify correlations between mapping data and a lifetime of an appliance, and therefore may use such data as a factor in predicting the expected remaining lifetime as a particular appliance.

Exemplary Server Computing Device

Figure 4:
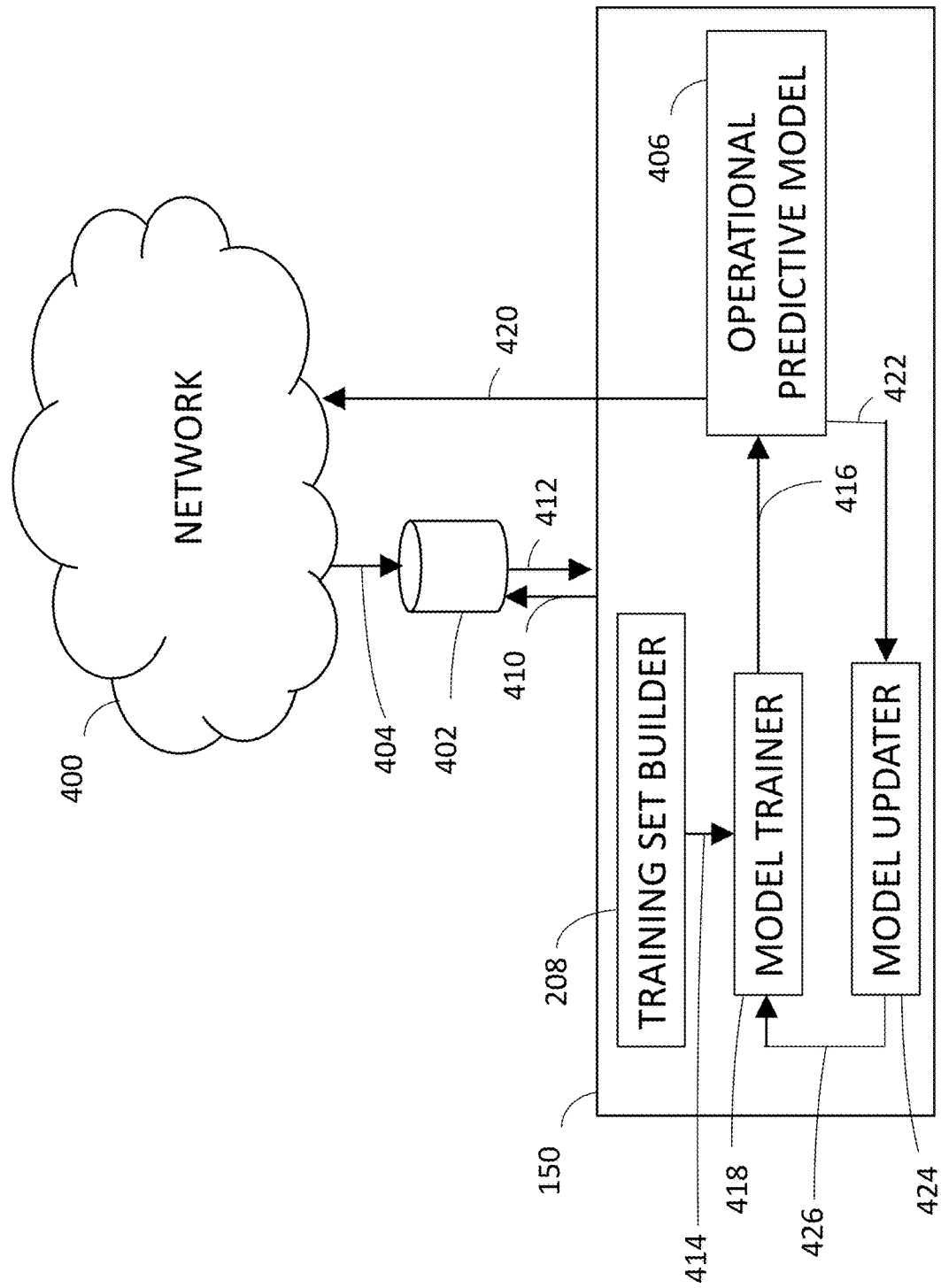
FIG. 4 illustrates an exemplary server computing device for use in the systems shown in FIGS. 1 and 2.

FIG. 4 is a schematic diagram illustrating further detail of server computing device 150 (shown in FIG. 1). Server computing device 150 may communicate with other components of system 100, such as manufacturer server 105, IoT devices 110, home controllers 135, and/or user devices 140, via a network 400. Server computing device may include and/or be in communication with a database 402 that stores data 404 including appliance data and other information relevant to predicting a lifetime of an appliance and/or generating recommendations relating to appliances. Data 404 received from network 400 may be stored in database 402. Server computing device 150 may configured to use data 404 to generate an operational predictive model module 406 for predicting a lifetime of an appliance and/or generating recommendations relating to appliances.

In exemplary embodiments, server computing device 150 includes a training set builder module 408 configured to submit one or more queries 410 to database 402 to retrieve subsets 412 of data 404, and to use those subsets 412 to build training data sets 414 for generating operational predictive model 206. For example, query 410 may be configured to retrieve certain fields from data 404 for appliances (e.g., IoT devices 110 and/or non-connected devices 112) having certain similar aspects, such as having a same manufacturer, similar features, similar amount of usage, and/or being located in similar (e.g., nearby) geolocations.

In exemplary embodiments, training set builder module 208 may be configured to derive training data sets 414 from retrieved subsets 412. Each training data set 414 corresponds to a historical data 404 ("historical" in this context means completed in the past, as opposed to completed in real-time with respect to the time of retrieval by training set builder module 122). Each training data set 414 may include "model input" data fields along with at least one "result" data field representing historical feedback, such as reports relating to repairs, maintenance, and/or replacement of appliances, and/or insurance claims in the area of homes 130, feedback received from homeowners, and/or decisions made by homeowners based upon previous recommendations (e.g., whether homeowners performed recommended maintenance actions). The model input data fields represent factors that may be expected to, or unexpectedly be found during model training to, have some correlation with a lifetime of an appliance.

In exemplary embodiments, the model input data fields in training data sets 414 may be generated from data fields in subset 412 corresponding to historical data 404. In other words, a trained machine learning model 416 produced by a model trainer module 418 for use by operational predictive model module 406 is trained to make predictions based on input values that can be generated from the data fields in data 404. Values in the model input data fields may include values copied directly from values in a corresponding data field in the retrieved subset 412, and/or values generated by modifying, combining, or otherwise operating upon values in one or more data fields in the retrieved subset 412. Values in the model input data fields may include appliances, information relating to historical lifetimes of appliances, and other data that may correlate to the historical lifetimes. The use of such data fields as model input data fields facilitates the machine learning model in weighing these factors directly.

After training set builder module 408 generates training data sets 414, training set builder module 408 passes the training data sets 414 to model trainer module 418. In example embodiments, model trainer module 418 is configured to apply the model input data fields of each training data set 414 as inputs to one or more machine learning models. Each of the one or more machine learning models is programmed to produce, for each training data set 414, at least one output intended to correspond to, or "predict," a value of the at least one result data field of the training data set 414. "Machine learning" refers broadly to various algorithms that may be used to train the model to identify and recognize patterns in existing data in order to facilitate making predictions for subsequent new input data.

Model trainer module 418 is configured to compare, for each training data set 414, the at least one output of the model to the at least one result data field of the training data set 414, and apply a machine learning algorithm to adjust parameters of the model in order to reduce the difference or "error" between the at least one output and the corresponding at least one result data field. In this way, model trainer module 418 trains the machine learning model to accurately predict the value of the at least one result data field. In other words, model trainer module 418 cycles the one or more machine learning models through the training data sets 414, causing adjustments in the model parameters, until the error between the at least one output and the at least one result data field falls below a suitable threshold, and then uploads at least one trained machine learning model 416 to operational predictive model module 406 for application to generating predictions 420. In example embodiments, model trainer module 418 may be configured to simultaneously train multiple candidate machine learning models and to select the best performing candidate for each result data field, as measured by the "error" between the at least one output and the corresponding result data field, to upload to operational predictive model module 406.

In certain embodiments, the one or more machine learning models may include one or more neural networks, such as a convolutional neural network, a deep learning neural network, or the like. The neural network may have one or more layers of nodes, and the model parameters adjusted during training may be respective weight values applied to one or more inputs to each node to produce a node output. In other words, the nodes in each layer may receive one or more inputs and apply a weight to each input to generate a node output. The node inputs to the first layer may correspond to the model input data fields, and the node outputs of the final layer may correspond to the at least one output of the model, intended to predict the at least one result data field. One or more intermediate layers of nodes may be connected between the nodes of the first layer and the nodes of the final layer. As model trainer module 418 cycles through the training data sets 414, model trainer module 418 applies a suitable backpropagation algorithm to adjust the weights in each node layer to minimize the error between the at least one output and the corresponding result data field. In this fashion, the machine learning model is trained to produce output that reliably predicts the corresponding result data field. Alternatively, the machine learning model may have any suitable structure.

In some embodiments, model trainer module 418 provides an advantage by automatically discovering and properly weighting complex, second- or third-order, and/or otherwise nonlinear interconnections between the model input data fields and the at least one output. Absent the machine learning model, such connections are unexpected and/or undiscoverable by human analysts.

In exemplary embodiments, operational predictive model module 406 may compare feedback (e.g., actual lifetimes of appliances, feedback received from homeowners, and/or decisions made by homeowners based upon previous recommendations), and may route a comparison result 422 generated by comparing prediction 420 to the feedback to a model updater module 424 of server computing device 150. Model updater module 424 is configured to derive a correction signal 426 from comparison results 422 received for one or more predictions 420, and to provide correction signal 426 to model trainer module 418 to enable updating or "re-training" of the at least one machine learning model to improve performance. The retrained at least one machine learning model 416 may be periodically re-uploaded to operational predictive model module 406.

Exemplary Computer System

Figure 5:
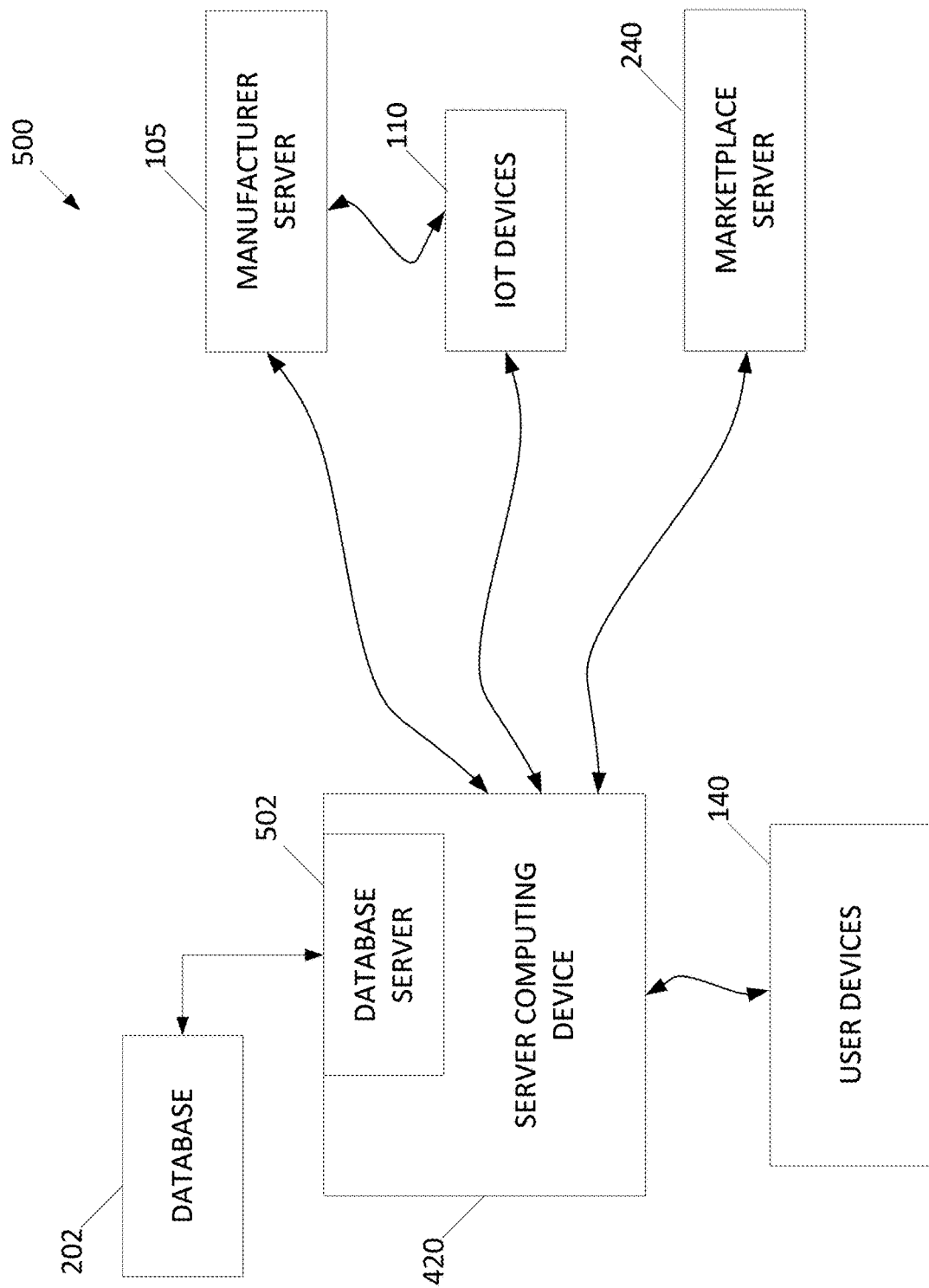
FIG. 5 illustrates an exemplary computer system for implementing the systems shown in FIGS. 1 and 2 performing the computer-implemented method shown in FIG. 8.

FIG. 5 illustrates an exemplary computer system 500 for implementing system 100 (shown in FIG. 1). In the exemplary embodiment, computer system 500 is used for analyzing data associated with a home 130 (shown in FIG. 1) to generate recommendations for connected home devices to install in home 130 to reduce a risk and/or improve safety associated with home 130.

In the exemplary embodiment, user devices 140 are computers that include a web browser or a software application, which enables user devices 140 to communicate with server computing device 150 using the Internet, a local area network (LAN), or a wide area network (WAN). In some embodiments, user devices 140 are communicatively coupled to the Internet through many interfaces including, but not limited to, at least one of a network, such as the Internet, a LAN, a WAN, or an integrated services digital network (ISDN), a dial-up-connection, a digital subscriber line (DSL), a cellular phone connection, a satellite connection, and a cable modem. User devices 140 can be any device capable of accessing a network, such as the Internet, including, but not limited to, a desktop computer, a laptop computer, a personal digital assistant (PDA), a cellular phone, a smartphone, a tablet, a phablet, wearable electronics, smart watch, virtual headsets or glasses (e.g., AR (augmented reality), VR (virtual reality), MR (mixed reality), or XR (extended reality) headsets or glasses), chat bots, voice bots, ChatGPT bots or ChatGPT-based bots, or other web-based connectable equipment or mobile devices.

In the exemplary embodiment, IoT devices 110 are computers that may include a web browser or a software application, which enables IoT devices 110 to communicate with server computing device 150 using the Internet, a local area network (LAN), or a wide area network (WAN). In some embodiments, the IoT devices 110 are communicatively coupled to the Internet through many interfaces including, but not limited to, at least one of a network, such as the Internet, a LAN, a WAN, or an integrated services digital network (ISDN), a dial-up-connection, a digital subscriber line (DSL), a cellular phone connection, a satellite connection, and a cable modem. IoT devices 110 can be any device capable of accessing a network, such as the Internet, including, but not limited to, a desktop computer, a laptop computer, a personal digital assistant (PDA), a cellular phone, a smartphone, a tablet, a phablet, wearable electronics, smart watch, virtual headsets or glasses (e.g., AR (augmented reality), VR (virtual reality), MR (mixed reality), or XR (extended reality) headsets or glasses), chat bots, voice bots, ChatGPT bots or ChatGPT-based bots, or other web-based connectable equipment or mobile devices. In the exemplary embodiment, IoT devices 110 as devices connected to the home network 205 (shown in FIG. 2) that provide information about the home 130.

In the exemplary embodiment, manufacturer servers 105 are computers that may include a web browser or a software application, which enables manufacturer servers 105 to communicate with associated source IoT devices 110 and the server computing device 150 using the Internet, a local area network (LAN), or a wide area network (WAN). In some embodiments, the manufacturer servers 105 are communicatively coupled to the Internet through many interfaces including, but not limited to, at least one of a network, such as the Internet, a LAN, a WAN, or an integrated services digital network (ISDN), a dial-up-connection, a digital subscriber line (DSL), a cellular phone connection, a satellite connection, and a cable modem. The manufacturer servers 105 can be any device capable of accessing a network, such as the Internet, including, but not limited to, a desktop computer, a laptop computer, a personal digital assistant (PDA), a cellular phone, a smartphone, a tablet, a phablet, wearable electronics, smart watch, virtual headsets or glasses (e.g., AR (augmented reality), VR (virtual reality), MR (mixed reality), or XR (extended reality) headsets or glasses), chat bots, voice bots, ChatGPT bots or ChatGPT-based bots, or other web-based connectable equipment or mobile devices.

In the exemplary embodiment, marketplace servers 240 are computers that may include a web browser or a software application, which enables marketplace servers 240 to communicate with associated the server computing device 150 using the Internet, a local area network (LAN), or a wide area network (WAN). In some embodiments, the marketplace servers 240 are communicatively coupled to the Internet through many interfaces including, but not limited to, at least one of a network, such as the Internet, a LAN, a WAN, or an integrated services digital network (ISDN), a dial-up-connection, a digital subscriber line (DSL), a cellular phone connection, a satellite connection, and a cable modem. The marketplace servers 240 can be any device capable of accessing a network, such as the Internet, including, but not limited to, a desktop computer, a laptop computer, a personal digital assistant (PDA), a cellular phone, a smartphone, a tablet, a phablet, wearable electronics, smart watch, virtual headsets or glasses (e.g., AR (augmented reality), VR (virtual reality), MR (mixed reality), or XR (extended reality) headsets or glasses), chat bots, voice bots, ChatGPT bots or ChatGPT-based bots, or other web-based connectable equipment or mobile devices.

In the exemplary embodiment, server computing device 150 is a computer that may include a web browser or a software application, which enables server computing device 150 to communicate with user devices 140 using the Internet, a local area network (LAN), or a wide area network (WAN). In some embodiments, the server computing device 150 is communicatively coupled to the Internet through many interfaces including, but not limited to, at least one of a network, such as the Internet, a LAN, a WAN, or an integrated services digital network (ISDN), a dial-up-connection, a digital subscriber line (DSL), a cellular phone connection, a satellite connection, and a cable modem. The server computing device 150 can be any device capable of accessing a network, such as the Internet, including, but not limited to, a desktop computer, a laptop computer, a personal digital assistant (PDA), a cellular phone, a smartphone, a tablet, a phablet, wearable electronics, smart watch, virtual headsets or glasses (e.g., AR (augmented reality), VR (virtual reality), MR (mixed reality), or XR (extended reality) headsets or glasses), chat bots, voice bots, ChatGPT bots or ChatGPT-based bots, or other web-based connectable equipment or mobile devices.

A database server 502 is communicatively coupled to a database 402 that stores data. In one embodiment, the database 402 is a database that includes home data, sensor data, property data, and/or recommendations. In some embodiments, the database 402 is stored remotely from the server computing device 150. In some embodiments, the database 402 is decentralized. In the example embodiment, a person can access the database 402 via user devices 140 by logging onto server computing device 150.

Exemplary Client Device

Figure 6:
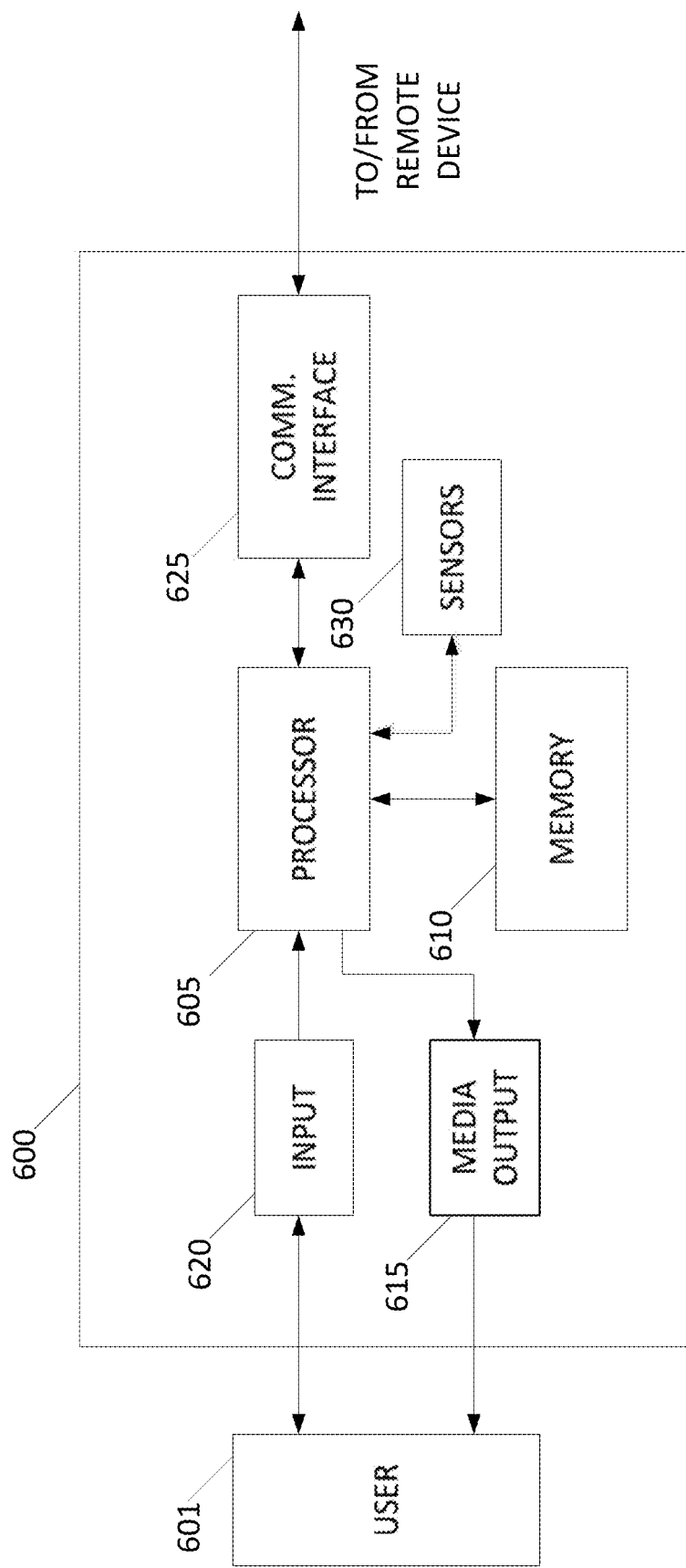
FIG. 6 depicts an exemplary configuration of a client computer device in accordance with one embodiment of the present disclosure.

FIG. 6 depicts an exemplary configuration of a client computer device shown in FIG. 5, in accordance with one embodiment of the present disclosure. User computer device 602 may be operated by a user 601. User computer device 602 may include, but is not limited to, user device 140, IoT devices 110, IoT camera 115, IoT thermostat 120, IoT door lock 125, (all shown in FIG. 1), EM devices 304, HVAC devices 314, home network computer devices 316, smart speaker devices 318, home entertainment devices 320, home security system 322, smart home system 324, home power management system 326, and/or home car charging station 328 (all shown in FIG. 3). User computer device 602 may include a processor 605 for executing instructions. In some embodiments, executable instructions are stored in a memory area 610. Processor 605 may include one or more processing units (e.g., in a multi-core configuration). Memory area 610 may be any device allowing information such as executable instructions and/or transaction data to be stored and retrieved. Memory area 610 may include one or more computer readable media.

User computer device 602 may also include at least one media output component 615 for presenting information to user 601. Media output component 615 may be any component capable of conveying information to user 601. In some embodiments, media output component 615 may include an output adapter (not shown) such as a video adapter and/or an audio adapter. An output adapter may be operatively coupled to processor 605 and operatively couplable to an output device such as a display device (e.g., a cathode ray tube (CRT), liquid crystal display (LCD), light emitting diode (LED) display, or "electronic ink" display), an audio output device (e.g., a speaker or headphones), virtual headsets (e.g., AR (Augmented Reality), VR (Virtual Reality), or XR (extended Reality) headsets), and/or voice or chat bots.

In some embodiments, media output component 615 may be configured to present a graphical user interface (e.g., a web browser and/or a client application) to user 601. A graphical user interface may include, for example, an online score viewing interface for viewing a home health score and determining more information about the home health score. In some embodiments, user computer device 602 may include an input device 620 for receiving input from user 601. User 601 may use input device 620 to, without limitation, select a provider.

Input device 620 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 615 and input device 620.

User computer device 602 may also include a communication interface 625, communicatively coupled to a remote device such as the server computing device 150 (shown in FIG. 1) and/or the marketplace server 240 (shown in FIG. 2). Communication interface 625 may include, for example, a wired or wireless network adapter and/or a wireless data transceiver for use with a mobile telecommunications network.

Stored in memory area 610 are, for example, computer readable instructions for providing a user interface to user 601 via media output component 615 and, optionally, receiving and processing input from input device 620. A user interface may include, among other possibilities, a web browser and/or a client application. Web browsers enable users, such as user 601, to display and interact with media and other information typically embedded on a web page or a website from the server computing device 150 and/or the marketplace server 240. A client application allows user 601 to interact with, for example, server computing device 150 and/or the marketplace server 240. For example, instructions may be stored by a cloud service, and the output of the execution of the instructions sent to the media output component 615.

Processor 605 executes computer-executable instructions for implementing aspects of the disclosure. In some embodiments, the processor 605 is transformed into a special purpose microprocessor by executing computer-executable instructions or by otherwise being programmed.

Exemplary Server Device

Figure 7:
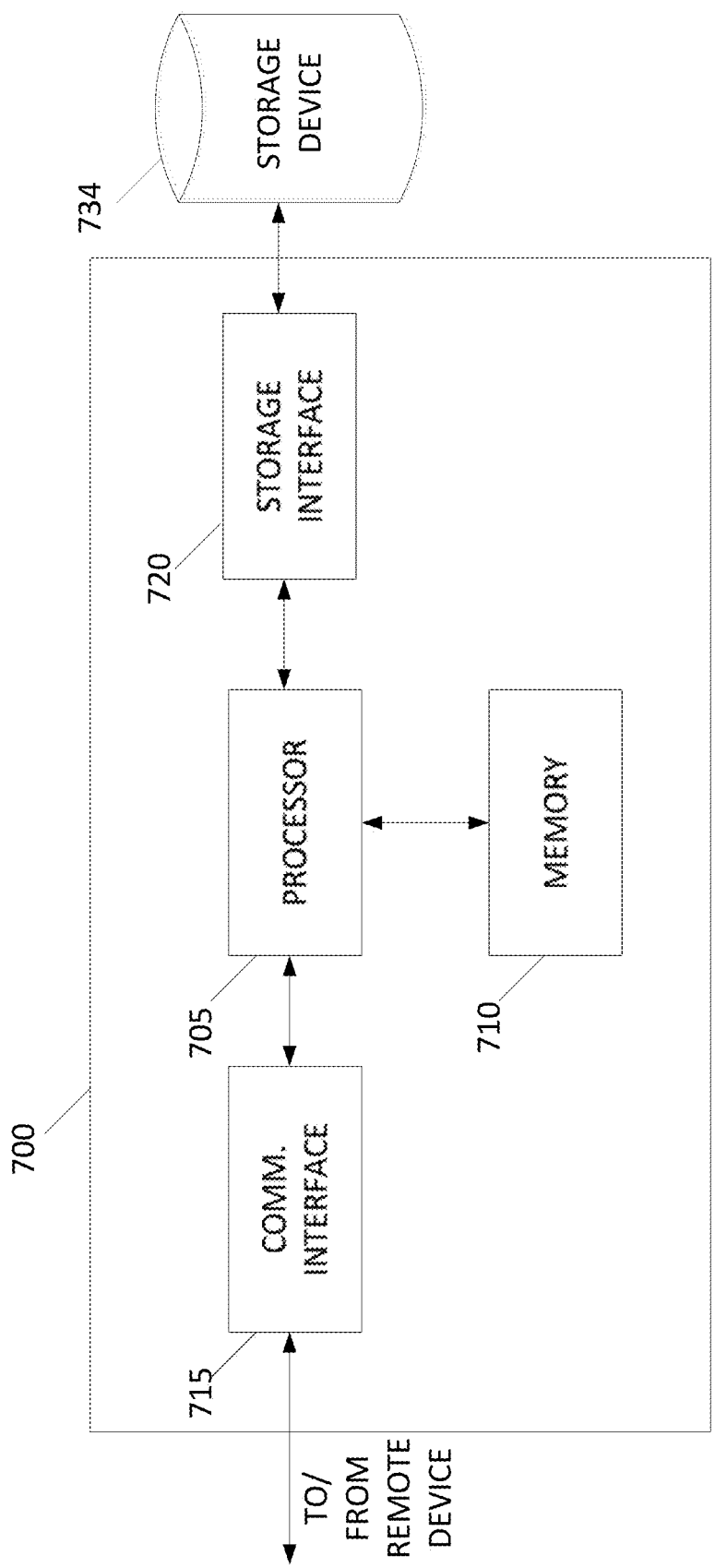
FIG. 7 depicts an exemplary configuration of a server computing device in accordance with one embodiment of the present disclosure.

FIG. 7 depicts an exemplary configuration of a server computing device 150 shown in FIG. 1, in accordance with one embodiment of the present disclosure. Server computer device 701 may include, but is not limited to, server computing device 150 (shown in FIG. 1), external data sources 215, marketplace server 240 (both shown in FIG. 2), home security system 322, smart home system 324, and/or home power management system 326, (all shown in FIG. 3). Server computer device 701 may also include a processor 705 for executing instructions. Instructions may be stored in a memory area 710. Processor 705 may include one or more processing units (e.g., in a multi-core configuration).

Processor 705 may be operatively coupled to a communication interface 715 such that server computer device 701 is capable of communicating with a remote device such as another server computer device 701. For example, communication interface 715 may receive requests from user device 140 via the Internet, as illustrated in FIG. 5.

Processor 705 may also be operatively coupled to a storage device 734. Storage device 734 may be any computer-operated hardware suitable for storing and/or retrieving data, such as, but not limited to, data associated with database 402 (shown in FIG. 4). In some embodiments, storage device 734 may be integrated in server computer device 700. For example, server computer device 701 may include one or more hard disk drives as storage device 734.

In other embodiments, storage device 734 may be external to server computer device 701 and may be accessed by a plurality of server computer devices 701. For example, storage device 634 may include a storage area network (SAN), a network attached storage (NAS) system, and/or multiple storage units such as hard disks and/or solid state disks in a redundant array of inexpensive disks (RAID) configuration.

In some embodiments, processor 705 may be operatively coupled to storage device 634 via a storage interface 720. Storage interface 720 may be any component capable of providing processor 605 with access to storage device 734. Storage interface 720 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 705 with access to storage device 734.

Processor 705 may execute computer-executable instructions for implementing aspects of the disclosure. In some embodiments, the processor 705 may be transformed into a special purpose microprocessor by executing computer-executable instructions or by otherwise being programmed. For example, the processor 705 may be programmed with the instructions such as illustrated in FIG. 8.

Exemplary Computer-Implemented Method for Predicting a Lifetime of an Appliance

Figure 8A:
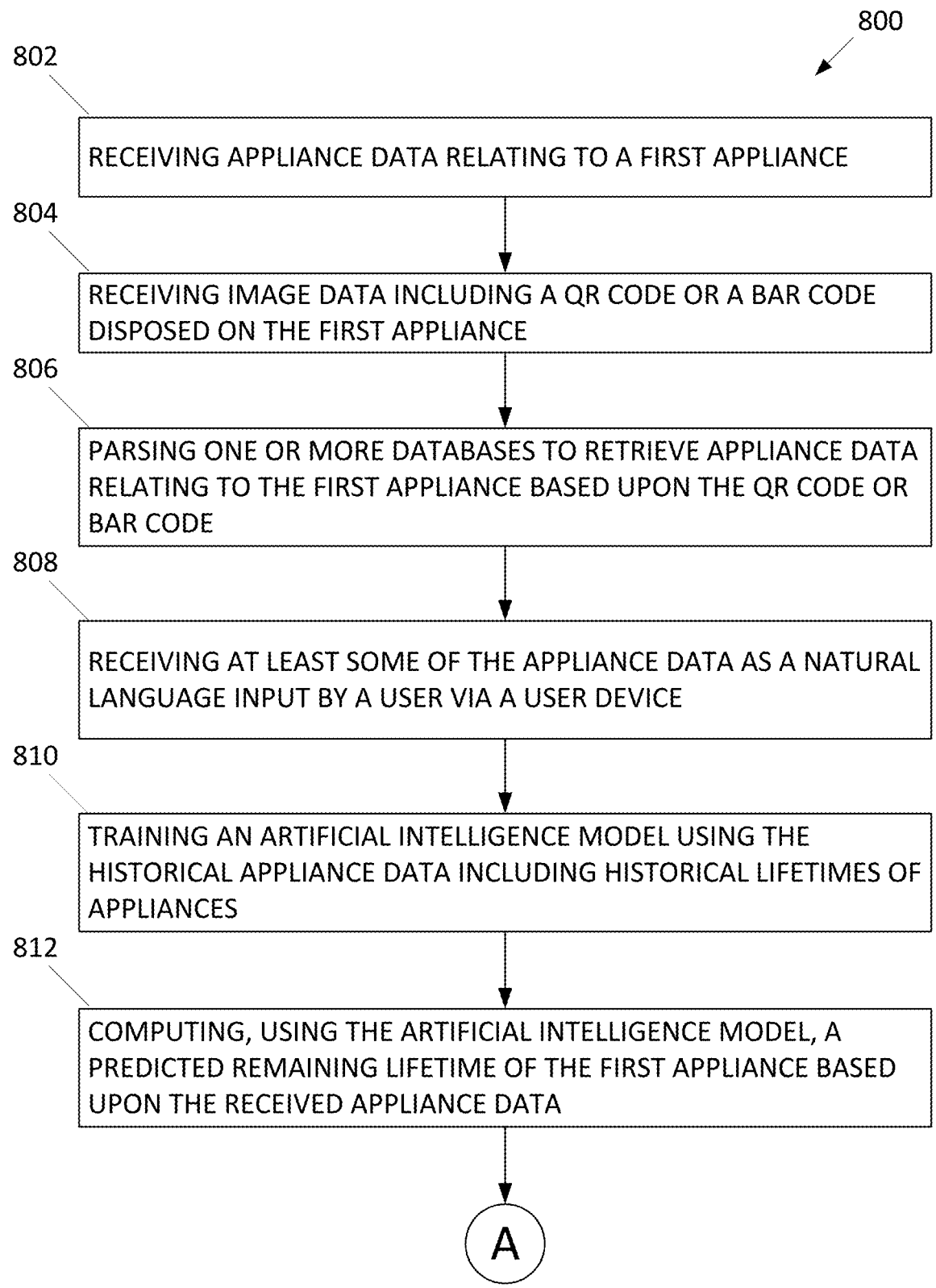
FIG. 8A depicts a flow chart of an exemplary computer-implemented method for predicting a lifetime of one or more appliances using the systems shown in FIGS. 1 and 2.
Figure 8B:
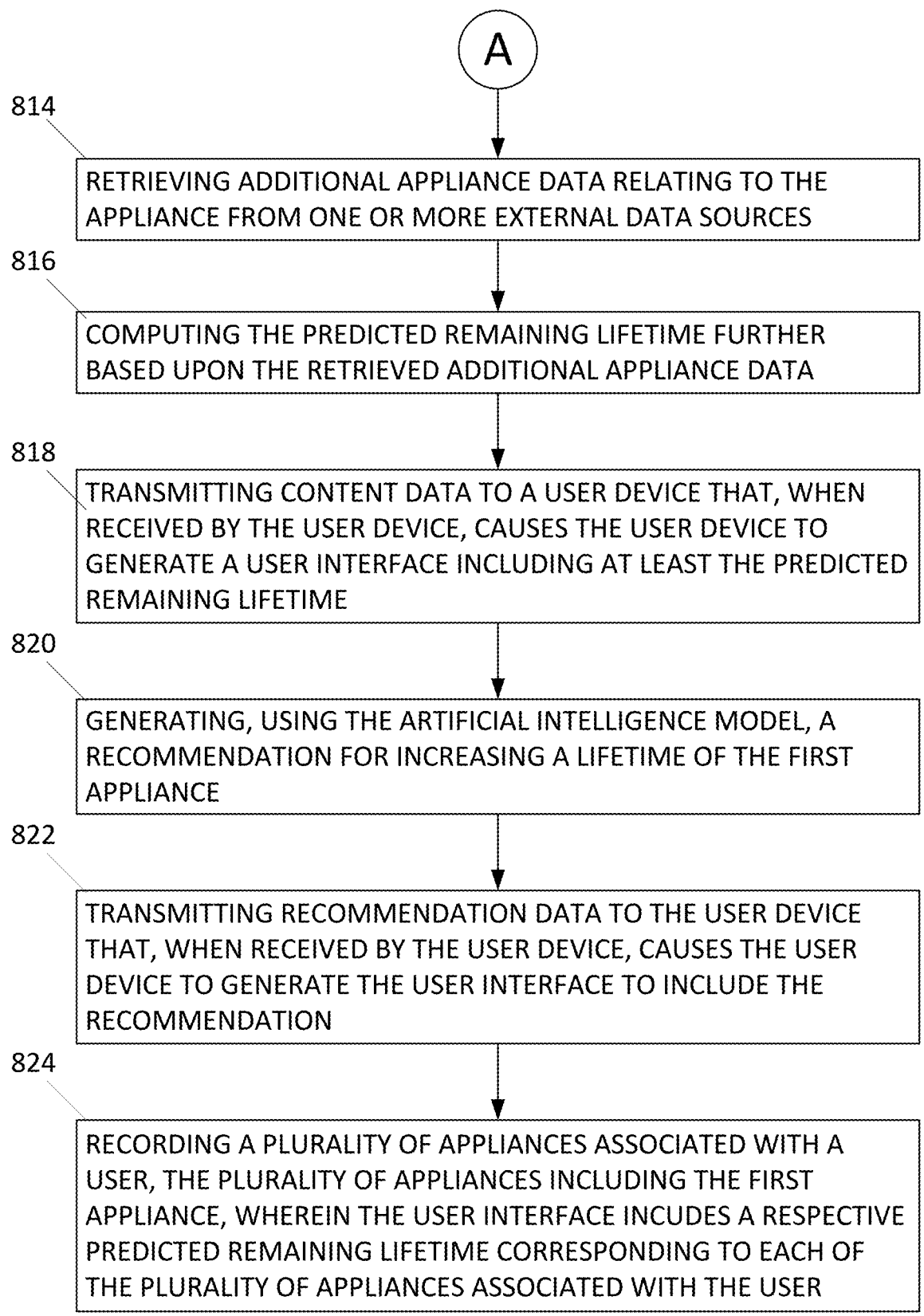
FIG. 8B is a continuation of the flow chart shown in FIG. 8A.

FIGS. 8A and 8B depict a flow chart of an exemplary computer-implemented method 800 for predicting a lifetime of one or more appliances such as IoT devices 110 and/or non-connected devices 112 (shown in FIG. 1) using system 100 (shown in FIG. 1).

In the exemplary embodiment, computer-implemented method 800 may include receiving 802 appliance data relating to a first appliance. In some embodiments, receiving 802 the appliance data may be performed by server computing device 150 (shown in FIG. 1).

In some embodiments, computer-implemented method 800 may further include receiving 804 image data including a QR code or a bar code disposed on the first appliance and parsing 806 one or more databases to retrieve appliance data relating to the first appliance based upon the QR code or bar code. In some embodiments, receiving 804 the image data and/or parsing 806 the database may be performed by server computing device 150 (shown in FIG. 1).

In some embodiments, computer-implemented method 800 further includes receiving 808 at least some of the appliance data as a natural language input by a user via a user device. In some embodiments, receiving 808 the appliance data may be performed by server computing device 150 (shown in FIG. 1).

In some embodiments, computer-implemented method 800 further includes training 810 the artificial intelligence model using the historical appliance data including historical lifetimes of appliances. In some embodiments, training 810 the AI model may be performed by server computing device 150 (shown in FIG. 1).

In the exemplary embodiment, computer-implemented method 800 may further include computing 812, using an artificial intelligence model, a predicted remaining lifetime of the first appliance based upon the received appliance data, wherein the artificial intelligence model is trained based upon historical appliance data including historical lifetimes of appliances. In some embodiments, computing 812 the predicted remaining lifetime may be performed by server computing device 150 (shown in FIG. 1).

In some embodiments, computer-implemented method 800 further includes retrieving 814 additional appliance data relating to the appliance from one or more external data sources and computing 816 the predicted remaining lifetime further based upon the retrieved additional appliance data. In some embodiments, retrieving 814 the additional appliance data and/or computing 816 the predicted remaining lifetime may be performed by server computing device 150 (shown in FIG. 1).

In the exemplary embodiment, computer-implemented method 800 may further include transmitting 818 content data to a user device that, when received by the user device, causes the user device to generate a user interface including at least the predicted remaining lifetime. In some embodiments, transmitting 818 the content data may be performed by server computing device 150 (shown in FIG. 1).

In some embodiments, computer-implemented method 800 further includes generating 820, using the artificial intelligence model, a recommendation for increasing a lifetime of the first appliance and transmitting 822 recommendation data to the user device that, when received by the user device, causes the user device to generate the user interface to include the recommendation. In some embodiments, generating 820 the recommendation and/or transmitting 822 the recommendation data may be performed by server computing device 150 (shown in FIG. 1). In some embodiments, the user interface indicates a change in the predicted remaining lifetime associated with performing the recommendation. In some embodiments, the recommendation includes a list of recommended maintenance actions. In some such embodiments, the recommended maintenance actions are ordered within the list based upon a change in the predicted remaining lifetime associated with each of the recommended maintenance actions. In some such embodiments, the recommendation includes at least one of a timeline or a calendar for performing the recommended maintenance actions. In some embodiments, the user interface includes at least one of a link to contact at least one service provider associated with at least one of the recommended maintenance actions.

In some embodiments, computer-implemented method 800 further includes recording 824 a plurality of appliances associated with a user, the plurality of appliances including the first appliance, wherein the user interface incudes a respective predicted remaining lifetime corresponding to each of the plurality of appliances associated with the user. In some embodiments, recording 824 the plurality of appliances may be performed by server computing device 150 (shown in FIG. 1).

Machine Learning and Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

In some embodiments, server computing device 150 is configured to implement machine learning, such that server computing device 150 "learns" to analyze, organize, and/or process data without being explicitly programmed. Machine learning may be implemented through machine learning methods and algorithms ("ML methods and algorithms"). In an exemplary embodiment, a machine learning module ("ML module") is configured to implement ML methods and algorithms. In some embodiments, ML methods and algorithms are applied to data inputs and generate machine learning outputs ("ML outputs"). Data inputs may include but are not limited to images. ML outputs may include, but are not limited to identified objects, items classifications, and/or other data extracted from the images. In some embodiments, data inputs may include certain ML outputs.

In some embodiments, at least one of a plurality of ML methods and algorithms may be applied, which may include but are not limited to: linear or logistic regression, instance-based algorithms, regularization algorithms, decision trees, Bayesian networks, cluster analysis, association rule learning, artificial neural networks, deep learning, combined learning, reinforced learning, dimensionality reduction, and support vector machines. In various embodiments, the implemented ML methods and algorithms are directed toward at least one of a plurality of categorizations of machine learning, such as supervised learning, unsupervised learning, and reinforcement learning.

In one embodiment, the ML module employs supervised learning, which involves identifying patterns in existing data to make predictions about subsequently received data. Specifically, the ML module is "trained" using training data, which includes example inputs and associated example outputs. Based upon the training data, the ML module may generate a predictive function which maps outputs to inputs and may utilize the predictive function to generate ML outputs based upon data inputs. The example inputs and example outputs of the training data may include any of the data inputs or ML outputs described above. In the exemplary embodiment, a processing element may be trained by providing it with a large sample of home attributes with known characteristics or features. Such information may include, for example, information associated with a plurality of IoT devices 110.

In another embodiment, a ML module may employ unsupervised learning, which involves finding meaningful relationships in unorganized data. Unlike supervised learning, unsupervised learning does not involve user-initiated training based upon example inputs with associated outputs. Rather, in unsupervised learning, the ML module may organize unlabeled data according to a relationship determined by at least one ML method/algorithm employed by the ML module. Unorganized data may include any combination of data inputs and/or ML outputs as described above.

In yet another embodiment, a ML module may employ reinforcement learning, which involves optimizing outputs based upon feedback from a reward signal. Specifically, the ML module may receive a user-defined reward signal definition, receive a data input, utilize a decision-making model to generate a ML output based upon the data input, receive a reward signal based upon the reward signal definition and the ML output, and alter the decision-making model so as to receive a stronger reward signal for subsequently generated ML outputs. Other types of machine learning may also be employed, including deep or combined learning techniques.

In some embodiments, generative artificial intelligence (AI) models (also referred to as generative machine learning (ML) models) may be utilized with the present embodiments, and may the voice bots or chatbots discussed herein may be configured to utilize artificial intelligence and/or machine learning techniques. For instance, the voice or chatbot may be a ChatGPT chatbot. The voice or chatbot may employ supervised or unsupervised machine learning techniques, which may be followed by, and/or used in conjunction with, reinforced or reinforcement learning techniques. The voice or chatbot may employ the techniques utilized for ChatGPT. The voice bot, chatbot, ChatGPT-based bot, ChatGPT bot, and/or other bots may generate audible or verbal output, text or textual output, visual or graphical output, output for use with speakers and/or display screens, and/or other types of output for user and/or other computer or bot consumption.

Based upon these analyses, the processing element may learn how to identify characteristics and patterns that may then be applied to analyzing and classifying objects. The processing element may also learn how to identify attributes of different objects in different lighting. This information may be used to determine which classification models to use and which classifications to provide.

ADDITIONAL EMBODIMENTS

In one aspect, a computing device for predicting a lifetime of one or more appliances may be provided. The computing device may include at least one processor and at least one memory device. The at least one processor may be configured to (1) receive appliance data relating to a first appliance; (2) compute, using an artificial intelligence model, a predicted remaining lifetime of the first appliance based upon the received appliance data, wherein the artificial intelligence model is trained based upon historical appliance data including historical lifetimes of appliances; and (3) transmit content data to a user device that, when received by the user device, causes the user device to generate a user interface including at least the predicted remaining lifetime.

In some embodiments, the at least one processor may be further configured to receive image data including a QR code or a bar code disposed on the first appliance and parse one or more databases to retrieve appliance data relating to the first appliance based upon the QR code or bar code.

In some embodiments, the at least one processor may be further configured to train the artificial intelligence model using the historical appliance data including historical lifetimes of appliances.

In some embodiments, the at least one processor may be further configured to receive at least some of the appliance data as a natural language input by a user via the user device.

In some embodiments, the at least one processor may be further configured to retrieve additional appliance data relating to the appliance from one or more external data sources and compute the predicted remaining lifetime further based upon the retrieved additional appliance data.

In some embodiments, the at least one processor may be further configured to generate, using the artificial intelligence model, a recommendation for increasing a lifetime of the first appliance and transmit recommendation data to the user device that, when received by the user device, causes the user device to generate the user interface to include the recommendation.

In some such embodiments, the user interface may indicate a change in the predicted remaining lifetime associated with performing the recommendation.

In some such embodiments, the recommendation may include a list of recommended maintenance actions.

In some such embodiments, the recommended maintenance actions may be ordered within the list based upon a change in the predicted remaining lifetime associated with each of the recommended maintenance actions.

In some such embodiments, the recommendation may include at least one of a timeline or a calendar for performing the recommended maintenance actions.

In some such embodiments, the user interface may include at least one of a link to contact at least one service provider associated with at least one of the recommended maintenance actions.

In some embodiments, the processor may be further configured to record a plurality of appliances associated with a user, wherein the plurality of appliances including the first appliance, and wherein the user interface incudes a respective predicted remaining lifetime corresponding to each of the plurality of appliances associated with the user.

In another aspect, a computer-implemented method for predicting a lifetime of one or more appliances may be provided. The computer-implemented method may be performed by a computing device including at least one processor and at least one memory device. The computer-implemented method may include (1) receiving appliance data relating to a first appliance; (2) computing, using an artificial intelligence model, a predicted remaining lifetime of the first appliance based upon the received appliance data, wherein the artificial intelligence model is trained based upon historical appliance data including historical lifetimes of appliances; and (3) transmitting content data to a user device that, when received by the user device, causes the user device to generate a user interface including at least the predicted remaining lifetime.

In some embodiments, the computer-implemented method further includes receiving image data including a QR code or a bar code disposed on the first appliance and parsing one or more databases to retrieve appliance data relating to the first appliance based upon the QR code or bar code.

In some embodiments, the computer-implemented method further includes training the artificial intelligence model using the historical appliance data including historical lifetimes of appliances.

In some embodiments, the computer-implemented method further includes receiving at least some of the appliance data as a natural language input by a user via the user device.

In some embodiments, the computer-implemented method further includes retrieving additional appliance data relating to the appliance from one or more external data sources and computing the predicted remaining lifetime further based upon the retrieved additional appliance data.

In some embodiments, the computer-implemented method further includes generating, using the artificial intelligence model, a recommendation for increasing a lifetime of the first appliance and transmitting recommendation data to the user device that, when received by the user device, causes the user device to generate the user interface to include the recommendation.

In some such embodiments, the user interface indicates a change in the predicted remaining lifetime associated with performing the recommendation.

In some such embodiments, the recommendation may include a list of recommended maintenance actions.

In some such embodiments, the recommended maintenance actions may be ordered within the list based upon a change in the predicted remaining lifetime associated with each of the recommended maintenance actions.

In some such embodiments, the recommendation may include at least one of a timeline or a calendar for performing the recommended maintenance actions.

In some such embodiments, the user interface may include at least one of a link to contact at least one service provider associated with at least one of the recommended maintenance actions.

In some embodiments, the computer-implemented method may further include recording a plurality of appliances associated with a user, wherein the plurality of appliances including the first appliance, and wherein the user interface incudes a respective predicted remaining lifetime corresponding to each of the plurality of appliances associated with the user.

In another aspect, at least one non-transitory computer-readable storage media having computer-executable instructions embodied thereon may be provided. When executed by a computing device including at least one processor and at least one memory device, the computer-executable instructions cause the at least one processor to: (1) receive appliance data relating to a first appliance; (2) compute, using an artificial intelligence model, a predicted remaining lifetime of the first appliance based upon the received appliance data, wherein the artificial intelligence model is trained based upon historical appliance data including historical lifetimes of appliances; and (3) transmit content data to a user device that, when received by the user device, causes the user device to generate a user interface including at least the predicted remaining lifetime.

In some embodiments, the computer-executable instructions may further cause the at least one processor to receive image data including a QR code or a bar code disposed on the first appliance and parse one or more databases to retrieve appliance data relating to the first appliance based upon the QR code or bar code.

In some embodiments, the computer-executable instructions may further cause the at least one processor to train the artificial intelligence model using the historical appliance data including historical lifetimes of appliances.

In some embodiments, the computer-executable instructions may further cause the at least one processor to receive at least some of the appliance data as a natural language input by a user via the user device.

In some embodiments, the computer-executable instructions may further cause the at least one processor to retrieve additional appliance data relating to the appliance from one or more external data sources and compute the predicted remaining lifetime further based upon the retrieved additional appliance data.

In some embodiments, the computer-executable instructions may further cause the at least one processor to generate, using the artificial intelligence model, a recommendation for increasing a lifetime of the first appliance and transmit recommendation data to the user device that, when received by the user device, causes the user device to generate the user interface to include the recommendation.

In some such embodiments, the user interface may indicate a change in the predicted remaining lifetime associated with performing the recommendation.

In some such embodiments, the recommendation may include a list of recommended maintenance actions.

In some such embodiments, the recommended maintenance actions may be ordered within the list based upon a change in the predicted remaining lifetime associated with each of the recommended maintenance actions.

In some such embodiments, the recommendation may include at least one of a timeline or a calendar for performing the recommended maintenance actions.

In some such embodiments, the user interface may include at least one of a link to contact at least one service provider associated with at least one of the recommended maintenance actions.

In some embodiments, the computer-executable instructions may further cause the at least one processor to record a plurality of appliances associated with a user, wherein the plurality of appliances including the first appliance, and wherein the user interface incudes a respective predicted remaining lifetime corresponding to each of the plurality of appliances associated with the user.

ADDITIONAL CONSIDERATIONS

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps," or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, the term "database" can refer to either a body of data, a relational database management system (RDBMS), or to both. As used herein, a database can include any collection of data including hierarchical databases, relational databases, flat file databases, object-relational databases, object-oriented databases, and any other structured collection of records or data that is stored in a computer system. The above examples are example only, and thus are not intended to limit in any way the definition and/or meaning of the term database. Examples of RDBMS' include, but are not limited to including, Oracle® Database, MySQL, IBM® DB2, Microsoft® SQL Server, Sybase®, and PostgreSQL. However, any database can be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In another example, a computer program is provided, and the program is embodied on a computer-readable medium. In an example, the system is executed on a single computer system, without requiring a connection to a server computer. In a further example, the system is being run in a Windows® environment (Windows is a registered trademark of Microsoft Corporation, Redmond, Washington). In yet another example, the system is run on a mainframe environment and a UNIX® server environment (UNIX is a registered trademark of X/Open Company Limited located in Reading, Berkshire, United Kingdom). In a further example, the system is run on an iOS® environment (iOS is a registered trademark of Cisco Systems, Inc. located in San Jose, CA). In yet a further example, the system is run on a Mac OS® environment (Mac OS is a registered trademark of Apple Inc. located in Cupertino, CA). In still yet a further example, the system is run on Android® OS (Android is a registered trademark of Google, Inc. of Mountain View, CA). In another example, the system is run on Linux® OS (Linux is a registered trademark of Linus Torvalds of Boston, MA). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and proceeded with the word "a" or "an" should be understood as not excluding plural elements or steps, unless such exclusion is explicitly recited. Furthermore, references to "example" or "one example" of the present disclosure are not intended to be interpreted as excluding the existence of additional examples that also incorporate the recited features. Further, to the extent that terms "includes," "including," "has," "contains," and variants thereof are used herein, such terms are intended to be inclusive in a manner similar to the term "comprises" as an open transition word without precluding any additional or other elements.

Furthermore, as used herein, the term "real-time" refers to at least one of the time of occurrence of the associated events, the time of measurement and collection of predetermined data, the time to process the data, and the time of a system response to the events and the environment. In the examples described herein, these activities and events occur substantially instantaneously.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computing device for predicting a lifetime of one or more appliances, the computing device comprising at least one processor and at least one memory device, the at least one processor configured to:
   receive historical appliance data including historical lifetimes of a plurality of appliances, at least some of the historical appliance data generated by sensors configured to monitor one or more parameters of at least one of the plurality of appliances;
   train an artificial intelligence model using the historical appliance data including the historical lifetimes of the plurality of appliances;
   receive appliance data relating to a first appliance;
   compute, using the artificial intelligence model, a predicted remaining lifetime of the first appliance based upon the received appliance data; and
   transmit content data to a user device that, when received by the user device, causes the user device to generate a user interface including at least the predicted remaining lifetime.

2. The computing device claim 1, wherein the at least one processor is further configured to:
   receive image data including a quick response (QR) code or a bar code disposed on the first appliance; and
   parse one or more databases to retrieve appliance data relating to the first appliance based upon the QR code or bar code.

3. The computing device of claim 1, wherein the at least one processor is further configured to receive at least some of the appliance data as a natural language input by a user via the user device.

4. The computing device of claim 1, wherein the at least one processor is further configured to:
   retrieve additional appliance data relating to the appliance from one or more external data sources; and
   compute the predicted remaining lifetime further based upon the retrieved additional appliance data.

5. The computing device of claim 1, wherein the at least one processor is further configured to:
   generate, using the artificial intelligence model, a recommendation for increasing a lifetime of the first appliance; and
   transmit recommendation data to the user device that, when received by the user device, causes the user device to generate the user interface to include the recommendation.

6. The computing device of claim 5, wherein the user interface indicates a change in the predicted remaining lifetime associated with performing the recommendation.

7. The computing device of claim 5, wherein the recommendation includes a list of recommended maintenance actions.

8. The computing device of claim 7, wherein the recommended maintenance actions are ordered within the list based upon a change in the predicted remaining lifetime associated with each of the recommended maintenance actions.

9. The computing device of claim 7, wherein the recommendation includes at least one of a timeline or a calendar for performing the recommended maintenance actions.

10. The computing device of claim 7, wherein the user interface includes at least one of a link to contact at least one service provider associated with at least one of the recommended maintenance actions.

11. The computing device of claim 1, wherein the processor is further configured to record a plurality of appliances associated with a user, wherein the plurality of appliances including the first appliance, and wherein the user interface incudes a respective predicted remaining lifetime corresponding to each of the plurality of appliances associated with the user.

12. A computer-implemented method for predicting a lifetime of one or more appliances, the computer-implemented method performed by a computing device including at least one processor and at least one memory device, the computer-implemented method comprising:
   receiving historical appliance data including historical lifetimes of a plurality of appliances, at least some of the historical appliance data generated by sensors configured to monitor one or more parameters of at least one of the plurality of appliances;

training an artificial intelligence model using the historical appliance data including the historical lifetimes of the plurality of appliances;

receiving appliance data relating to a first appliance;

computing, using the artificial intelligence model, a predicted remaining lifetime of the first appliance based upon the received appliance data; and transmitting content data to a user device that, when received by the user device, causes the user device to generate a user interface including at least the predicted remaining lifetime.

13. The computer-implemented method claim 12, further comprising:

receiving image data including a quick response (QR) code or a bar code disposed on the first appliance; and parsing one or more databases to retrieve appliance data relating to the first appliance based upon the QR code or bar code.

14. The computer-implemented method of claim 12, further comprising receiving at least some of the appliance data as a natural language input by a user via the user device.

15. The computer-implemented method of claim 12, further comprising:

retrieving additional appliance data relating to the appliance from one or more external data sources; and computing the predicted remaining lifetime further based upon the retrieved additional appliance data.

16. The computer-implemented method of claim 12, further comprising:

generating, using the artificial intelligence model, a recommendation for increasing a lifetime of the first appliance; and transmitting recommendation data to the user device that, when received by the user device, causes the user device to generate the user interface to include the recommendation.

17. The computer-implemented method of claim 16, wherein the user interface indicates a change in the predicted remaining lifetime associated with performing the recommendation.

18. At least one non-transitory computer-readable storage media having computer-executable instructions embodied thereon, wherein when executed by a computing device including at least one processor and at least one memory device, the computer-executable instructions cause the at least one processor to:

receive historical appliance data including historical lifetimes of a plurality of appliances, at least some of the historical appliance data generated by sensors configured to monitor one or more parameters of at least one of the plurality of appliances;

train an artificial intelligence model using the historical appliance data including the historical lifetimes of the plurality of appliances;

receive appliance data relating to a first appliance;

compute, using the artificial intelligence model, a predicted remaining lifetime of the first appliance based upon the received appliance data; and transmit content data to a user device that, when received by the user device, causes the user device to generate a user interface including at least the predicted remaining lifetime.

* * * * *